US012289574B2

(12) United States Patent
Boothe et al.

(10) Patent No.: US 12,289,574 B2
(45) Date of Patent: Apr. 29, 2025

(54) OCCUPANT-BASED AUDIO CONTROL FOR ENCLOSED ENVIRONMENTS

(71) Applicant: Apple Inc., Cupertino, CA (US)

(72) Inventors: Daniel K. Boothe, San Francisco, CA (US); Onur I. Ilkorur, Santa Clara, CA (US); Marty E. Johnson, Los Gatos, CA (US); Chris Wilk, Los Gatos, CA (US); Andrea Baldioceda Oreamuno, Santa Clara, CA (US); Dan W. Maier, Denver, CO (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 17/966,754

(22) Filed: Oct. 14, 2022

(65) Prior Publication Data

US 2023/0217144 A1 Jul. 6, 2023

Related U.S. Application Data

(60) Provisional application No. 63/296,827, filed on Jan. 5, 2022.

(51) Int. Cl.
*H04R 1/02* (2006.01)
*B60R 11/02* (2006.01)
*H04R 5/02* (2006.01)

(52) U.S. Cl.
CPC .......... *H04R 1/025* (2013.01); *B60R 11/0217* (2013.01); *H04R 5/02* (2013.01); *H04R 2499/13* (2013.01)

(58) Field of Classification Search
CPC ................ H04R 2499/13; H04R 5/023; H04R 2430/20; H04R 2203/12; H04R 5/02; H04R 1/32; B60R 11/0217

USPC ............. 381/86, 302, 389, 71.4, 387, 58, 56
See application file for complete search history.

(56) References Cited

U.S. PATENT DOCUMENTS

| | | | |
|---|---|---|---|
| 10,313,819 B1 * | 6/2019 | Dublin | H04S 7/302 |
| 2001/0038698 A1 * | 11/2001 | Breed | B60R 21/01536 381/86 |
| 2012/0121113 A1 * | 5/2012 | Li | H04R 1/403 381/86 |
| 2014/0064526 A1 * | 3/2014 | Otto | H04R 5/04 381/300 |
| 2019/0215606 A1 * | 7/2019 | You | B60N 2/879 |

(Continued)

FOREIGN PATENT DOCUMENTS

| | | | |
|---|---|---|---|
| CN | 113590077 | * | 11/2021 |
| JP | 2016082446 | * | 5/2016 |

*Primary Examiner* — Norman Yu
(74) *Attorney, Agent, or Firm* — BAKERHOSTETLER

(57) ABSTRACT

Implementations of the subject technology provide occupant-based audio for enclosed environments. For example, an apparatus having an enclosure and one or more speakers may determine a location and/or an identity of an occupant within an enclosed environment defined by the enclosure, and operate the one or more speakers to provide audio output to the location of the occupant. The apparatus may also operate the one or more speakers to reduce the audio output to one or more other locations within the enclosure, such as to one or more non-occupant locations and/or to one or more locations of one or more other occupants. The audio output may be occupant-specific audio output, such as a personalized notifications, in one or more implementations.

42 Claims, 19 Drawing Sheets

(56) References Cited

U.S. PATENT DOCUMENTS

2019/0289398 A1   9/2019  Escobar et al.
2020/0245067 A1   7/2020  Moriki et al.
2020/0285240 A1*  9/2020  Diehl .............. B60W 60/00253
2020/0374624 A1*  11/2020 Koschak .............. G10K 11/178

* cited by examiner

OPERATE A BEAMFORMING ARRAY OF SPEAKERS INCLUDING THE SPEAKER TO BEAM A FIRST CHANNEL OF THE AUDIO OUTPUT TOWARD THE DETERMINED LOCATION —1902

FIG. 19

OCCUPANT-BASED AUDIO CONTROL FOR ENCLOSED ENVIRONMENTS

CROSS REFERENCE TO RELATED APPLICATIONS

This application claims the benefit of priority to U.S. Provisional Patent Application No. 63/296,827, entitled, "Occupant-Based Audio Control for Enclosed Environments", filed on Jan. 5, 2022, the disclosure of which is hereby incorporated herein in its entirety.

TECHNICAL FIELD

The present description relates generally to acoustic devices, including, for example, occupant-based audio control for enclosed environments.

BACKGROUND

Acoustic devices can include speakers that generate sound and microphones that detect sound. Acoustic devices are often deployed in enclosed spaces, such as conference rooms, to provide audio output to the population of occupants in the enclosed space.

BRIEF DESCRIPTION OF THE DRAWINGS

Certain features of the subject technology are set forth in the appended claims. However, for purpose of explanation, several embodiments of the subject technology are set forth in the following figures.

FIG. 19 illustrates a flow chart of example operations that may be performed for providing occupant-based audio using a beamforming speaker array in accordance with implementations of the subject technology.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Implementations of the subject technology described herein provide occupant-based audio control for enclosed environments. In one or more implementations, the occupant-based audio may include directed audio for enclosed environments. In one or more implementations, an apparatus may include an enclosed environment, and one or more speakers such as one or more dual-directional speakers, one or more ringed arrays of speakers, one or more isobaric cross-firing speakers, and/or one or more door-mounted speaker arrays, any or all of which may direct sound to one or more desired locations within the enclosed environment, such as based on the location(s) and/or identity(ies) of one or more occupants within the enclosed environment.

Figure 1:
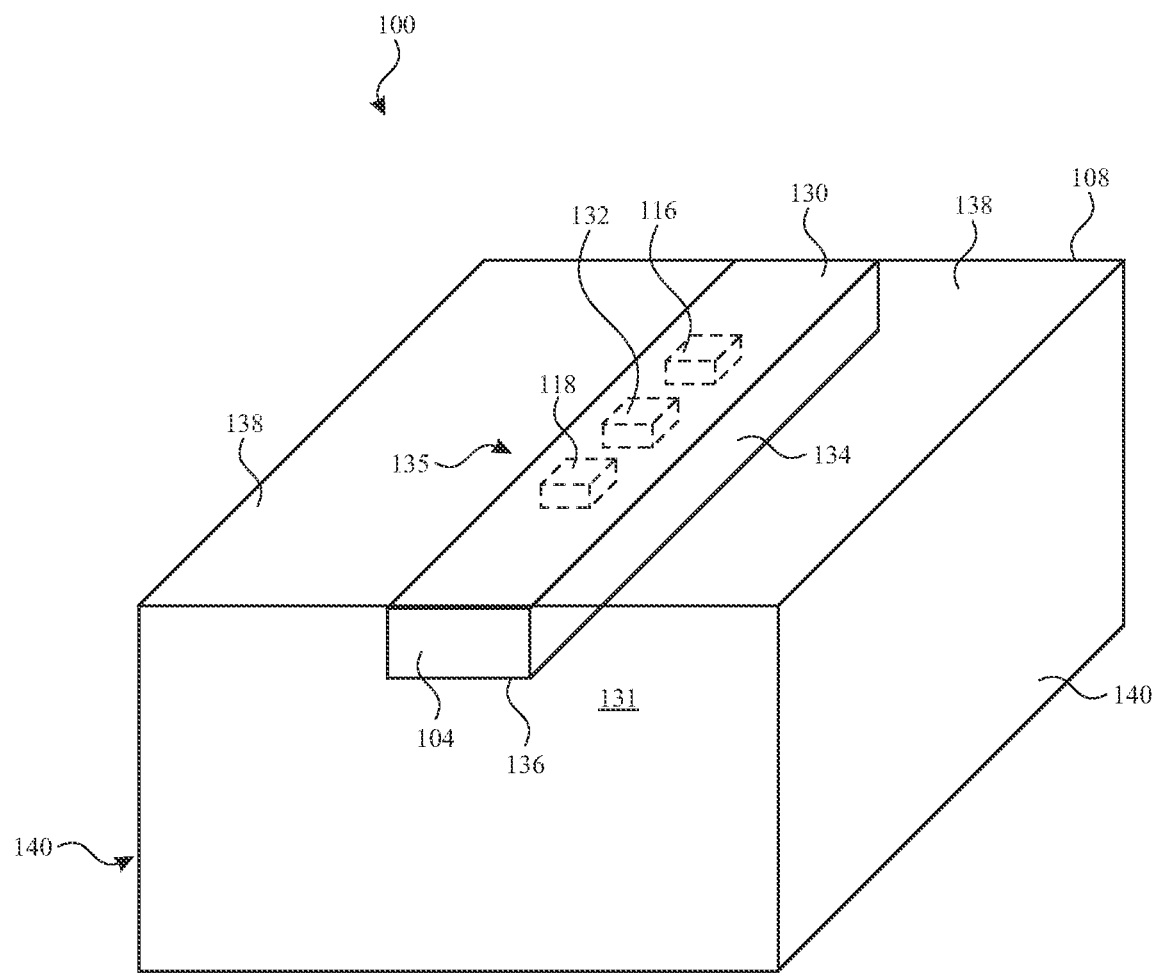
FIGS. 1 and 2 illustrate aspects of an example apparatus in accordance with one or more implementations.

An illustrative apparatus including one or more speakers for directed audio is shown in FIG. 1. In the example of FIG. 1, an apparatus 100 includes an enclosure 108 and a structural support member 104. The enclosure may (e.g., at least partially) define an enclosed environment 131. In the example of FIG. 1, the enclosure 108 includes top housing structures 138 mounted to and extending from opposing sides of the structural support member 104, and a sidewall housing structure 140 extending from each top housing structure 138.

In this example, the enclosure 108 is depicted as a rectangular enclosure in which the sidewall housing structures 140 are attached at an angle to a corresponding top housing structure 138. However, it is also appreciated that this arrangement is merely illustrative, and other arrangements are contemplated. For example, in one or more implementations, the top housing structure 138 and the sidewall housing structure 140 on one side of the structural support member 104 may be formed from a single (e.g., monolithic) structure having a bend or a curve between a top portion (e.g., corresponding to a top housing structure 138) and a side portion (e.g., corresponding to a sidewall housing structure 140). For example, in one or more implementations, the top housing structure 138 and the sidewall housing structure 140 on each side of the structural support member 104 may be formed from a curved glass structure. In this and/or other implementations, the sidewall housing structure 140 and/or other portions of the enclosure 108 may be or include a reflective surface (e.g., an acoustically reflective surface).

As illustrated in FIG. 1, the apparatus 100 may include various components such as one or more safety components 116, one or more speakers 118, and/or one or more other components 132. In the example of FIG. 1, the safety component 116, the speaker 118, and the other component 132 are mounted in a structural space 130 at least partially within the structural support member 104. The other component 132 may include, as examples, one or more cameras, and/or one or more sensors. The cameras and/or sensors may be used to identify an occupant within the enclosed environment 131 and/or to determine the location of an occupant within the enclosed environment 131. It is also contemplated that one or more safety components 116, one or more speakers 118, and/or one or more other components 132 may also, and/or alternatively, be mounted to the enclosure 108, and/or to and/or within one or more other structures of the apparatus 100. As shown in FIG. 1, the structural support member 104 may include a first side 134, an opposing second side 135, and a bottom surface 136 that faces an interior of the enclosed environment 131 defined by the enclosure 108.

In various implementations, the apparatus 100 may be implemented as a stationary apparatus (e.g., a conference room or other room within a building) or a moveable apparatus (e.g., a vehicle such as an autonomous or semi-autonomous vehicle, a train car, an airplane, a boat, a ship, a helicopter, etc.) that can be temporarily occupied by one or more human occupants. In one or more implementations, (although not shown in FIG. 1), the apparatus 100 may include one or more seats for one or more occupants. In one or more implementations, one or more of the seats may be mounted facing in the same direction as one or more other seats, and/or in a different (e.g., opposite) direction of one or more other seats.

In one or more implementations, the apparatus 100 may be implemented as a moveable platform such as a vehicle (e.g., an autonomous vehicle that navigates roadways using sensors and/or cameras and substantially without control by a human operator, a semiautonomous that includes human operator controls and that navigates roadways using sensors and/or cameras with the supervision of a human operator, or a vehicle with the capability of switching between a fully autonomous driving mode, a semiautonomous driving mode, and/or a human controlled mode).

In one or more use cases, it may be desirable to provide audio content to one or more occupants within the enclosed environment 131. The audio content may include general audio content intended for all of the occupants and/or personalized audio content for one or a subset of the occupants. For example, in implementations in which the apparatus 100 is a moveable apparatus, it may be desirable to notify a particular occupant that their stop is upcoming or that the apparatus 100 has arrived at their stop, without conveying that notification to other occupants within the enclosed space. In these and/or other use cases, it may be desirable to be able to direct the audio content, or a portion of the audio content, to one or more particular locations within the enclosed environment 131 and/or to suppress the audio content and/or a portion of the audio content at one or more other particular locations within the enclosed environment 131. In various examples, the speaker 118 may be implemented as a dual-directional speaker, a speaker of a ringed array of speakers, an isobaric cross-firing speaker, or a speaker of a door-mounted speaker array, as discussed in further detail hereinafter in connection with FIGS. 3-13.

In various implementations, the apparatus 100 may include one or more other structure, mechanical, electronical, and/or computing components that are not shown in FIG. 1. For example, FIG. 2 illustrates a schematic diagram of the apparatus 100 in accordance with one or more implementations.

Figure 2:
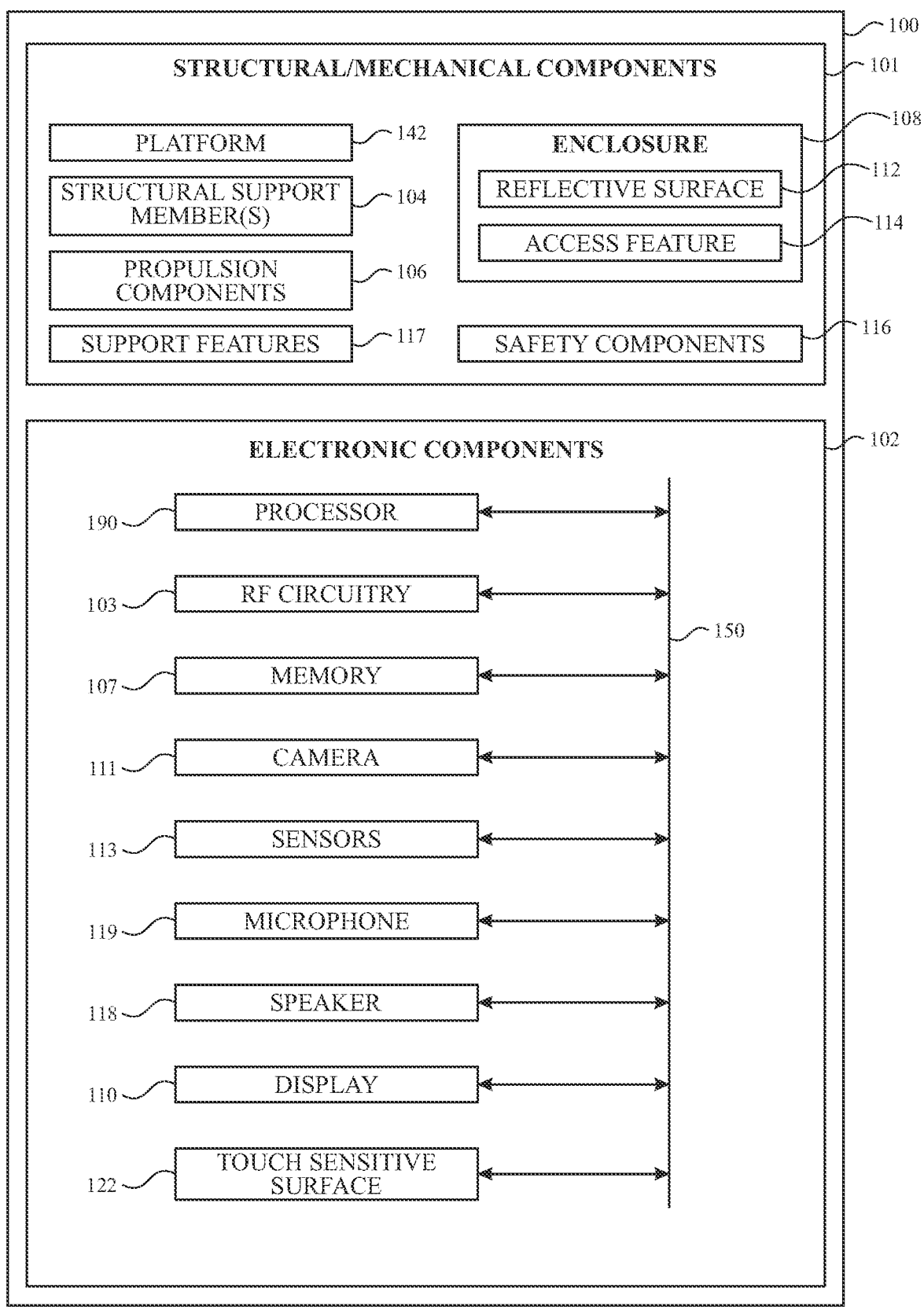

As shown in FIG. 2, the apparatus 100 may include structural and/or mechanical components 101 and electronic components 102. In this example, the structural and/or mechanical components 101 include the enclosure 108, the structural support member 104, and the safety component 116 of FIG. 6. In this example, the structural and/or mechanical components 101 also include a platform 142, propulsion components 106, and support features 117. In this example, the enclosure 108 includes a reflective surface 112 and an access feature 114.

As examples, the safety components 116 may include one or more seatbelts, one or more airbags, a roll cage, one or more fire-suppression components, one or more reinforcement structures, or the like. As examples, the platform 142 may include a floor, a portion of the ground, or a chassis of a vehicle. As examples, the propulsion components may include one or more drive system components such as an engine, a motor, and/or one or more coupled wheels, gearboxes, transmissions, or the like. The propulsion components may also include one or more power sources such as fuel tank and/or a battery. As examples, the support feature 117 may be support features for occupants within the enclosed environment 131 of FIG. 1, such as one or more seats, benches, and/or one or more other features for supporting and/or interfacing with one or more occupants. As examples, the reflective surface 112 may be a portion of a top housing structure 138 or a sidewall housing structure 140 of FIG. 1, such as a glass structure (e.g., a curved glass structure). As examples, the access feature 114 may be a door or other feature for selectively allowing occupants to enter and/or exit the enclosed environment 131 of FIG. 1.

As illustrated in FIG. 2, the electronic components 102 may include various components, such as a processor 190, RF circuitry 103 (e.g., WiFi, Bluetooth, near field communications (NFC) or other RF communications circuitry), memory 107, a camera 111 (e.g., an optical wavelength camera and/or an infrared camera, which may be implemented in the other components 132 of FIG. 1), sensors 113 (e.g., an inertial sensor, such as one or more accelerometers, one or more gyroscopes, and/or one or more magnetometers, radar sensors, ranging sensor such as LIDAR sensors, depth sensors, temperature sensors, humidity sensors, etc. which may also be implemented in the other components 132 of FIG. 1), a microphone 119, a speaker 118, a display 110, and a touch-sensitive surface 122. These components optionally communicate over a communication bus 150. Although a single processor 190, RF circuitry 103, memory 107, camera 111, sensor 113, microphone 119, speaker 118, display 110, and touch-sensitive surface 122 are shown in FIG. 2, it is appreciated that the electronic components 102 may include one, two, three, or generally any number of processors 190, RF circuitry 103, memories 107, cameras 111, sensors 113, microphones 119, speakers 118, displays 110, and/or touch-sensitive surfaces 122.

In the example of FIG. 2, apparatus 100 includes a processor 190 and memory 107. Processor 190 may include one or more general processors, one or more graphics processors, and/or one or more digital signal processors. In some examples, memory 107 may include one or more non-transitory computer-readable storage mediums (e.g., flash memory, random access memory, volatile memory, non-volatile memory, etc.) that store computer-readable instructions configured to be executed by processor 190 to perform the techniques described below.

In one or more implementations, cameras 111 and/or sensors 113 may be used to identify an occupant within the enclosed environment 131 and/or to determine the location of an occupant within the enclosed environment 131. For example, one or more cameras 111 may capture images of the enclosed environment 131, and the processor 190 may use the images to determine whether each seat within the enclosed environment 131 is occupied by an occupant. In various implementations, the processor 190 may use the images to make a binary determination of whether a seat is occupied or unoccupied, or may determine whether a seat is occupied by a particular occupant. In one or more implementations, the occupant can be actively identified by information provided by the occupant upon entry into the enclosed environment 131 (e.g., by scanning an identity card or a mobile device acting as an identity card with a sensor 113, or by facial recognition or other identity verification using the cameras 111 and/or the sensors 113), or passively (e.g., by determining that a seat is occupied and that that seat has been previously reserved for a particular occupant during a particular time period, such as by identifying an occupant of a seat as a ticketholder for that seat).

RF circuitry 103 optionally includes circuitry for communicating with electronic devices, networks, such as the Internet, intranets, and/or a wireless network, such as cellular networks and wireless local area networks (LANs). RF circuitry 103 optionally includes circuitry for communicating using near-field communication and/or short-range communication, such as Bluetooth®.

Display 110 may incorporate LEDs, OLEDs, a digital light projector, a laser scanning light source, liquid crystal on silicon, or any combination of these technologies. Examples of display 110 include head up displays, automotive windshields with the ability to display graphics, windows with the ability to display graphics, lenses with the ability to display graphics, tablets, smartphones, and desktop or laptop computers. In one or more implementations, display 110 may be operable in combination with the speaker 118 and/or with a separate display (e.g., a display of a smartphone, a tablet device, a laptop computer, a smart watch, or other device) of a separate device within the enclosed environment 131.

Touch-sensitive surface 122 may be configured for receiving user inputs, such as tap inputs and swipe inputs. In some examples, display 110 and touch-sensitive surface 122 form a touch-sensitive display.

Camera 111 optionally includes one or more visible light image sensors, such as charged coupled device (CCD) sensors, and/or complementary metal-oxide-semiconductor (CMOS) sensors operable to obtain images within the enclosed environment 131 and/or of an environment external to the enclosure 108. Camera 111 may also optionally include one or more infrared (IR) sensor(s), such as a passive IR sensor or an active IR sensor, for detecting infrared light from within the enclosed environment 131 and/or of an environment external to the enclosure 108. For example, an active IR sensor includes an IR emitter, for emitting infrared light. Camera 111 also optionally includes one or more event camera(s) configured to capture movement of objects such as occupants within the enclosed environment 131 and/or objects such as vehicles, roadside objects and/or pedestrians outside the enclosure 108. Camera 111 also optionally includes one or more depth sensor(s) configured to detect the distance of physical elements from the enclosure 108 and/or from other objects within the enclosed environment 131. In some examples, camera 111 includes CCD sensors, event cameras, and depth sensors that are operable in combination to detect the physical setting around apparatus 100.

In some examples, sensors 113 may include radar sensor(s) configured to emit radar signals, and to receive and detect reflections of the emitted radar signals from one or more objects in the environment around the enclosure 108. Sensors 113 may also, or alternatively, include one or more scanners (e.g., a ticket scanner, a fingerprint scanner or a facial scanner), one or more depth sensors, one or more motion sensors, one or more temperature or heat sensors, or the like. In some examples, one or more microphones such as microphone 119 may be provided to detect sound from an occupant within the enclosed environment 131 and/or from one or more audio sources external to the enclosure 108. In some examples, microphone 119 includes an array of microphones that optionally operate in tandem, such as to identify ambient noise or to locate the source of sound in space.

Sensors 113 may also include positioning sensors for detecting a location of the apparatus 100, and/or inertial sensors for detecting an orientation and/or movement of apparatus 100. For example, processor 190 of the apparatus 100 may use inertial sensors and/or positioning sensors (e.g., satellite-based positioning components) to track changes in the position and/or orientation of apparatus 100, such as with respect to physical elements in the physical environment around the apparatus 100. Inertial sensor(s) of sensors 113 may include one or more gyroscopes, one or more magnetometers, and/or one or more accelerometers.

Figure 3:
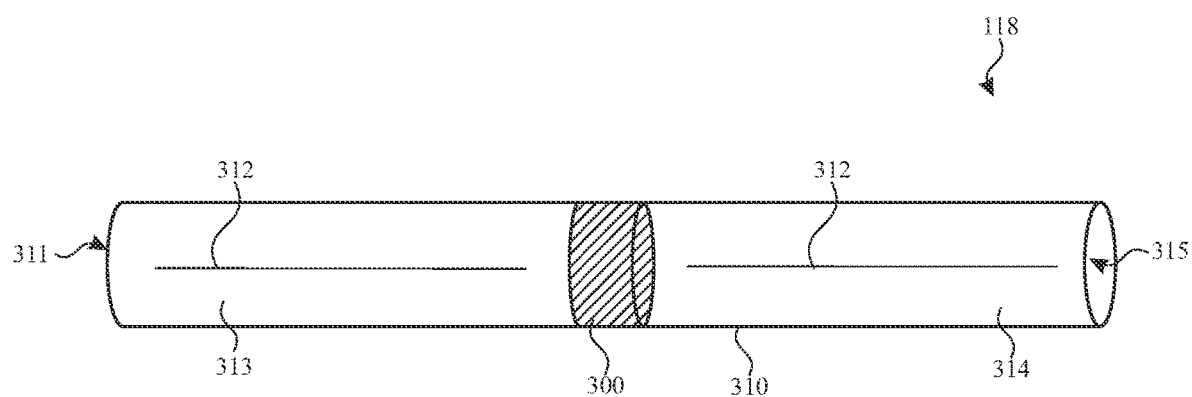
FIGS. 3 and 4 illustrate side perspective views of example dual-directional acoustic devices in accordance with implementations of the subject technology.
Figure 4:
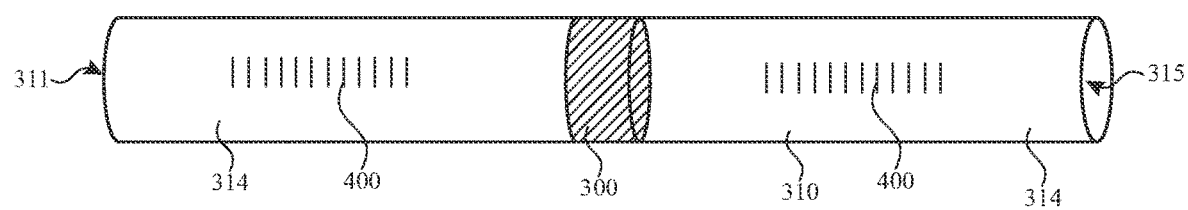
Figure 5:
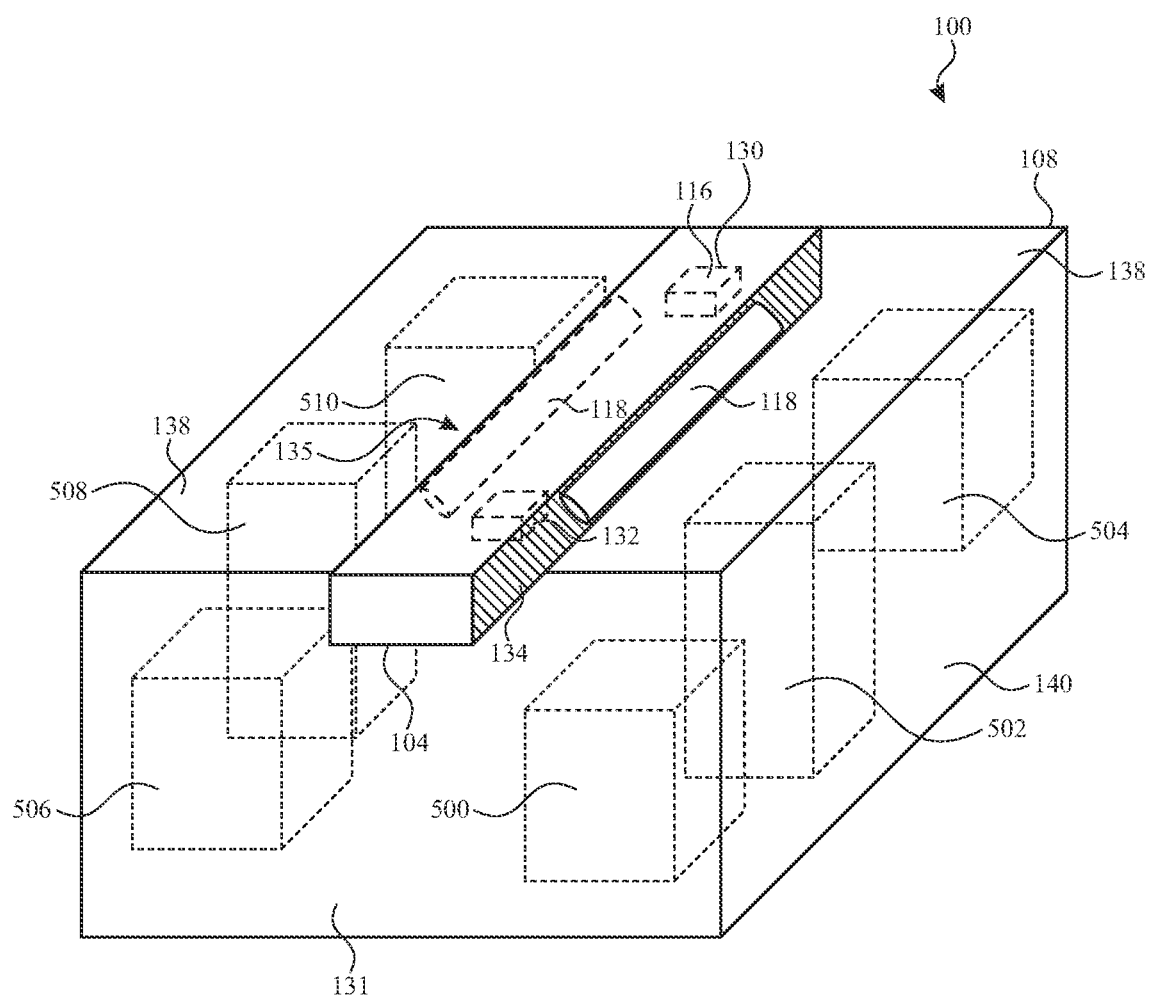
FIG. 5 illustrates a perspective view of an example apparatus having an enclosed space and incorporating a dual-directional acoustic device in accordance with implementations of the subject technology.
Figure 6:
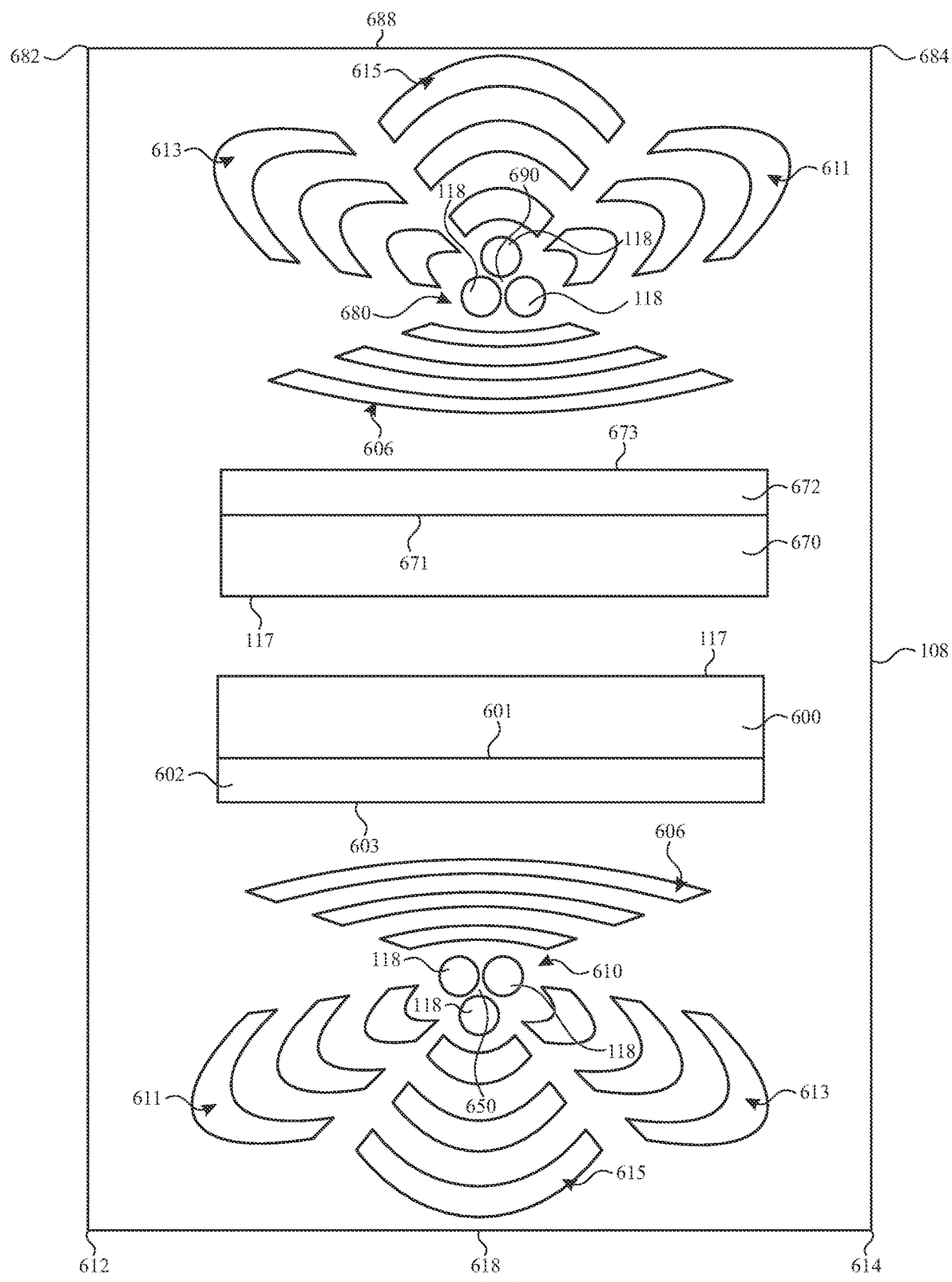
FIG. 6 illustrates a perspective view of an example apparatus having an enclosed space and incorporating a ringed speaker array in accordance with implementations of the subject technology.
Figure 7:
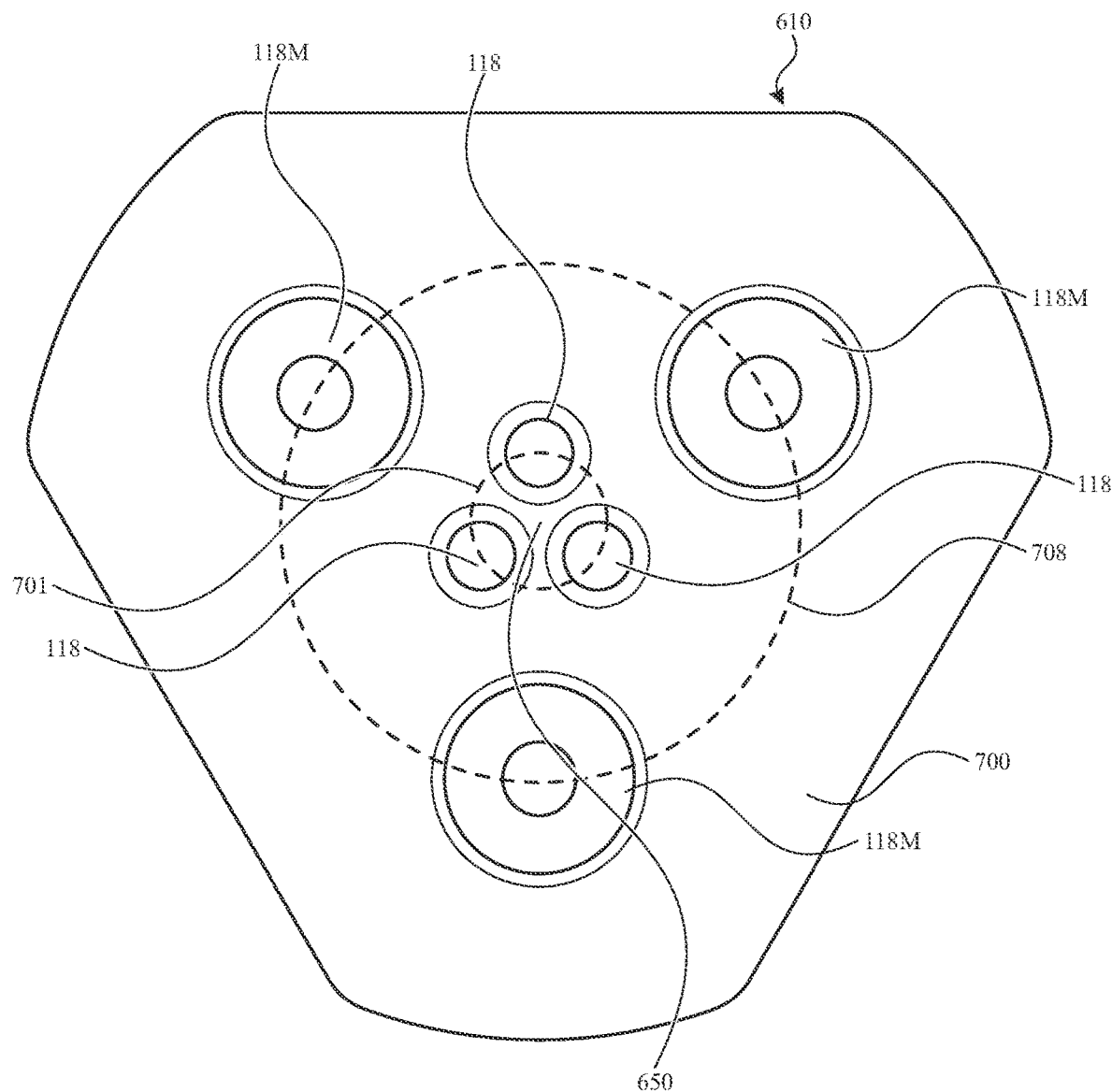
FIG. 7 illustrates an example beamforming speaker array in accordance with implementations of the subject technology.
Figure 8:
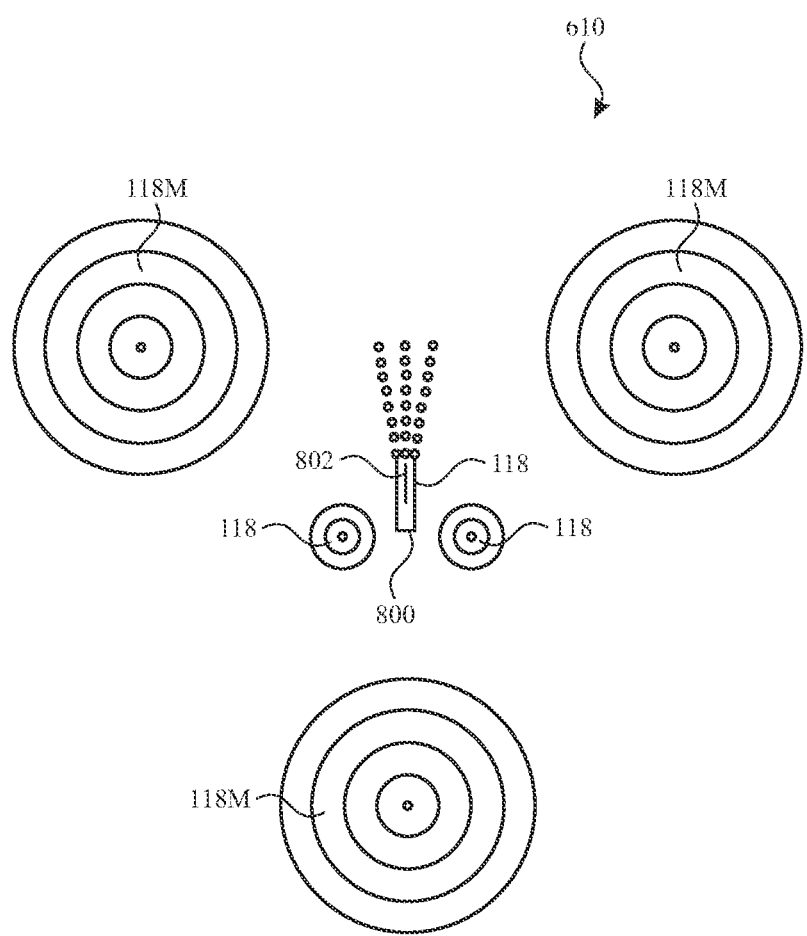
FIG. 8 illustrates an example beamforming speaker array having a directional feature in accordance with implementations of the subject technology.

As discussed herein, speaker 118 may be implemented as a dual-directional speaker, a speaker of a ringed array of speakers, an isobaric cross-firing speaker, or a speaker of a door-mounted speaker array, in various implementations. FIG. 3-5 illustrate examples in which the speaker 118 is implemented as a dual-directional speaker. FIG. 6-8 illustrate examples in which the speaker 118 is implemented as a speaker of a ringed array of speakers. FIGS. 9-12 illustrate examples in which the speaker 118 is implemented as an isobaric cross-firing speaker. FIG. 13 illustrates an example in which the speaker 118 is implemented as a speaker of a door-mounted speaker array.

FIG. 3 illustrates a perspective view of an example dual-directional speaker, in accordance with one or more implementations. As shown in FIG. 3, a dual directional speaker may include a sound-generating element 300 mounted between a pair of acoustic ducts (e.g., acoustic duct 313 and acoustic duct 314). In the example of FIG. 3, the pair of acoustic ducts 313 and 314 of the speaker 118 have a common longitudinal axis. In this arrangement the acoustic duct 313 and the acoustic duct 314 are formed by respective elongated channels in a common channel housing 310, and each have a corresponding slot 312 in the common channel housing 310.

In the example of FIG. 3, the sound-generating element 300 is mounted within the channel housing 310 between the acoustic duct 313 and the acoustic duct 314. In other implementations, the sound-generating element 300 may be mounted to the channel housing 310 so as to project sound into an aperture at the center of the channel housing 310 that can then propagate down each of the acoustic ducts. The sound-generating element 300 may include speaker components such a moveable diaphragm that can be actuated (e.g., via attachment to a voice coil or a magnet that move relative to each other responsive to a current in the voice coil, or any other speaker driver mechanism). In any of these various implementations, the sound-generating element 300 generates sound that is projected through the acoustic duct 313 to an opening 311, and through the acoustic duct 314 to an opening 315. The acoustic duct 313 and the acoustic duct 314 may each be fluidly coupled to (e.g., and form a part of) a front volume of the sound-generating element 300, and the sound-generating element 300 may also include a back volume that is acoustically and/or fluidly separate from the front volume, the acoustic duct 313, and the acoustic duct 314.

As shown in the example of FIG. 3, the acoustic duct 313 and the acoustic duct 314 each include a slot 312 that fluidly couples the respective acoustic duct with the external environment at a location between the sound-generating element 300 and the respective openings 311 and 312. Although a single slot 312 is visible in the example of FIG. 3 for each acoustic duct, the channel housing 310 may include multiple slots 312 (e.g., two slots 312 symmetrically disposed on opposing sides of the channel housing, three slots 312, or more than three slots 312) for each acoustic duct.

In the example of FIG. 3, the slot 312 extends along the length of the channel housing 310 in parallel with a longitudinal axis of the channel housing 310 and the acoustic ducts 313 and 314 defined therein. FIG. 4 illustrates another example of the channel housing 310 in which multiple slots 400 are instead provided in the channel housing 310. In the example of FIG. 4, the slots 400 are oriented transversely to the longitudinal axis of the channel housing 310 and are spaced apart along the length of the channel housing 310 in a direction parallel with the longitudinal axis of the channel housing 310 and the acoustic ducts 313 and 314 defined therein.

In the examples of FIGS. 3 and 4, the slot 312 in each of the acoustic ducts 313 and 314 has a uniform slot width along the respective acoustic duct, and the slots 400 are uniformly shaped and uniformly spaced along the acoustic ducts 313 and 314. For example, a uniform slot width may be implemented to form as narrow a projected beam as possible at all frequencies. In these uniform slot-width implementations, the projected beam becomes monotonically narrower as frequency increases. However, it is also appreciated that the width of a longitudinal slot such as the slot 312 may change along the length of the acoustic duct 313 and/or the acoustic duct 314, and/or the slots 400 may have transverse slot lengths and/or longitudinal slot widths that change (e.g., from one slot 400 to a next slot 400) along the length of the acoustic duct 313 and/or the acoustic duct 314. For example, an expanding slot width (e.g., expanding along the length of an acoustic duct in a direction away from the sound-generating element 300) can be implemented to generate a projected beam that settles at a particular width, such that the directivity of the projected beam is more constant with frequency.

For example, in one or more implementations, one or more longitudinal slots, such as one or more of the slots 312 of FIG. 3, may be implemented as an expanding slot having a slot width that is relatively narrow at a proximal slot end nearer to the sound-generating element 300 and expands in a direction parallel to the longitudinal axis of the channel housing 310 (e.g., and the acoustic duct 313 and/or the acoustic duct 314 defined therein) toward a distal slot end further from the sound-generating element 300. In one or more implementations, the slot width can increase uniformly away from the sound-generating element 300 along the length of the channel housing 310 (e.g., at a constant expansion angle of between thirty degrees and sixty degrees, or at another constant expansion angle). In one or more other implementations, the slot width can have non-linear variations along the length of the channel housing 310. It is appreciated that the exact expansion profile of a slot can be tailored for a particular implementation, to create a desired directivity of the sound projected from the acoustic duct 313 and/or the acoustic duct 314.

In one or more implementations, the slots 312, and/or one or more transverse slots such as the slots 400, may be covered by an acoustic mesh. In one or implementations, an acoustic mesh that covers the slots 312 and/or one or more transvers slots such as the slots 400 may have an acoustic resistance value that changes along the length of the acoustic duct 313 and/or the acoustic duct 314 (e.g., along a direction away from the sound-generating element 300 and parallel to the longitudinal axis of the channel housing 310). For example, providing an acoustic mesh with an acoustic resistance value that changes along the length of the acoustic duct 313 and/or the acoustic duct 314 may help improve the directionality of the respective acoustic duct (e.g., as a function of frequency).

In the examples of FIGS. 3 and 4, the slot(s) 312 and/or the slots 400 allow portions of the sound generated by the sound-generating element 300 to leak out of each of the acoustic ducts to the external environment at various locations along the length of the acoustic ducts. Because the sound that exits the slot(s) leaks out of the acoustic ducts to at various distances from the sound-generating element, the sound exits with varied phases that substantially cancel out the sound in a direction perpendicular to the longitudinal axis of each acoustic duct. In this way, the acoustic duct 313 directs a portion of the sound through the opening 311 in a first direction along of the longitudinal axis of the channel housing and away from sound-generating element, and the acoustic duct 314 directs the other portion of the sound through the opening 315 in a second direction along of the longitudinal axis of the channel housing and away from sound-generating element. In this example, the first direction is substantially opposite the second direction. However, by modifying the orientation of one or both of the acoustic ducts 313 and 314, while maintaining the sound-generating element at the origin of both acoustic ducts, the dual-directional speaker of FIG. 3 can be modified to direct sound in any two directions. Moreover, one or more additional directional features (e.g., acoustic ducts with slots) can be added extending from the sound-generating element 300 and to opposing open end to direct sound from the sound-generating element in one or more additional directions. In one or more other implementations, each of several acoustic ducts with slots can be provided with its own corresponding sound-generating element, so that each acoustic duct can be used in combination with and/or separately from the other acoustic ducts to direct particular sounds in particular desired directions.

FIG. 5 illustrates an implementation in which a pair of dual-directional speakers (e.g., a pair of the speakers 118 of FIG. 3 or the speakers 118 of FIG. 4) are implemented in the apparatus 100 of FIGS. 1 and 2. In the example of FIG. 5, the apparatus 100 includes the structural support member 104, a safety component 116 mounted to the structural support member 104, top housing structure 138 and sidewall housing structure 140 (e.g., formed by a single curved glass enclosure structure sealingly mounted to the structural support member 104), a first directional speaker (e.g., a dual-directional implementation of speaker 118) mounted to a first side 134 of the structural support member 104, and a second directional speaker (e.g., a second dual-directional implementation of speaker 118) mounted to a second side 135 of the structural support member 104. In one or more implementations, the first directional speaker (e.g., a first dual-directional implementation of speaker 118) mounted to the first side 134 of the structural support member 104 and the second directional speaker (e.g., a second dual-directional implementation of speaker 118) mounted to the second side 135 of the structural support member may each be implemented as a dual-directional speaker, as described above in connection with FIG. 3 or FIG. 4. For example, as shown in FIG. 5, the first directional speaker mounted to the first side 134 of the structural support member 104 and the second directional speaker mounted to the second side 135 of the structural support member 104 each include a pair of acoustic ducts that are oriented in opposite directions along a common longitudinal axis.

For example, the first directional speaker may be mounted to the first side 134 of the structural support member 104 such that a longitudinal axis of the first directional speaker is parallel to a longitudinal axis of the second directional speaker mounted to the second side 135 of the structural support member, as shown in FIG. 5. As shown in FIG. 5, the orientation of the first directional speaker mounted to the first side 134 of the structural support member 104 allows the first directional speaker mounted to the first side 134 of the structural support member 104 to project sound to a first region 500 and a second region 504 within the enclosed environment 131, without projecting sound to a third region 502 within the enclosed environment 131. In this example, the orientation of the second directional speaker mounted to the second side 135 of the structural support member 104 allows the second directional speaker mounted to the second side 135 of the structural support member 104 to project sound to a fourth region 506 and a fifth region 510 within the enclosed environment 131, without projecting sound to a sixth region 508 within the enclosed environment 131.

In one or more implementations, the apparatus 100 may be implemented as a moveable platform such as a vehicle, the structural support member 104 defines a structural space 130, and the safety component 116 may be implemented as an airbag that is mounted in the structural space 130. In one or more other implementations, the safety component 116 may be implemented as a sprinkler head or other fire suppression component in a building or in a vehicle.

In one or more implementations, the first region 500, the second region 504, the fourth region 506, and the fifth region 510 may be occupant regions of the enclosed environment 131. For example, the apparatus 100 may include one or more seats or standing areas in one or more of the first region 500, the second region 504, the fourth region 506, and the fifth region 510 that can be temporally occupied by an occupant.

For example, the apparatus 100 may include first, second, third, and/or fourth seats (e.g., in the first region 500, the second region 504, the fourth region 506, and/or the fifth region 510 respectively). In one or more implementations the first seat faces the second seat, the third seat faces the fourth seat, the first directional speaker (e.g., a first dual-directional implementation of speaker 118, as shown) is disposed between the first and second seats, and the second directional speaker (e.g., second dual-directional implementation of speaker 118, as shown) is disposed between the third and fourth seats. In this configuration, the first directional speaker may include a first elongated channel (e.g., acoustic duct 313) that directs audio output toward the first seat and a second elongated channel (e.g., acoustic duct 314) that directs audio output toward the second seat, and the second directional speaker may include a third elongated channel (e.g., acoustic duct 313) that directs audio output toward the third seat and a fourth elongated channel (e.g., acoustic duct 314) that directs audio output toward the fourth seat.

FIG. 6 illustrates a schematic top view of an example implementation of the apparatus 100 in which the speaker 118 is implemented as a speaker of a ringed array of speakers. In the example of FIG. 6, the apparatus 100 includes the enclosure 108 and a seat 600 within the enclosure 108. As shown, the seat 600 may have a seat back 602 with a first side 601 configured to interface with an occupant within the enclosure (e.g., when the occupant is seated on the seat 600 and resting their back against the seat back 602), and an opposing second side 603. As indicated, the seat 600 may be an implementation of the support feature 117 of FIG. 2.

In the example of FIG. 6, the apparatus 100 also includes a speaker array 610 spaced apart from the opposing second side 603 of the seat back 602, and having a center 650. In this example, the speaker array 610 includes an array of three speakers 118 that are mounted at a first common radial distance from the center 650 of the speaker array. In this example, the speaker array 610 may be operated as a beamforming array that generates interference patterns in sound emitted by the speakers 118 (e.g., by coordinating the time and frequency with which each speaker of the array emits sound) to controllably beam audible sound in a desired direction from the array. In one or more implementations, different audio channels (e.g., different content channels, such as surround sound channels which may include a front channel, a right channel, a left channel, a rear height channel, a left surround channel, and/or a right surround channel, in one or more implementations) may be beamed in different directions from the speaker array 610. This is in contrast with surround sound systems that use a dedicated speaker for each surround sound channel, the dedicated speakers located at the locations from which the corresponding channel is desired to originate.

In one or more implementations, the apparatus 100 may also include control circuitry (e.g., including processor 190 and/or memory 107 of FIG. 2) that receives a first audio channel and a second audio channel, and operates the speaker array 610 to beam a first sound 606 corresponding to the first audio channel (e.g., a rear height channel) toward the seat 600 and/or toward a ceiling or roof (e.g. toward the top housing structure 138 of FIG. 1) of the enclosure 108, and beam a second sound 615 corresponding to the second audio channel (e.g., an ambience channel) toward a portion 618 of the enclosure 108 away from the seat 600. For example, the portion 618 of the enclosure 108 away from the seat 600 may include a rear wall or a rear window of the enclosure.

For example, the control circuitry may operate the speaker array 610 to beam the second sound directly away from the seat 600 toward a rear wall of the enclosure 108. As illustrated in the example of FIG. 6, the control circuitry may also beam a third sound 611 corresponding to a third audio channel (e.g., a left surround channel) toward a first corner 612 of the enclosure 108, and to beam a fourth sound 613 corresponding to a fourth audio channel (e.g., a right surround channel) toward a second corner 614 of the enclosure 108. In this way, the speaker array 610 may act as a directional beamforming speaker array that generates sounds that occupants within the enclosure 108 perceive as originating from various locations away from the speaker array 610 to provide a surround sound experience within the enclosed environment 131.

In the example of FIG. 6, the speaker array 610 is arranged such that the speakers 118 face substantially upward (e.g., toward a top housing structure 138). In this arrangement, the speaker array 610 is separated from the opposing second side 603 of the seat back 602 in a direction parallel to a plane that passes through a common point (e.g., a center, or a particular other particular point that is present on each of the speakers 118) on each speaker 118 of the speaker array 610.

In one or more implementations, the apparatus 100 may also include an additional seat (e.g., seat 670) within the enclosure 108, the additional seat having a seat back 672 with a first side 671 facing the first side 601 of the seat back 602 of the seat 600 and configured to interface with another occupant seated on the seat 670 within the enclosure 108, and an opposing second side 673. In one or more implementations, the apparatus 100 may also include an additional speaker array 680 spaced apart from the opposing second side 673 of the seat back 672 of the seat 670 and having a center 690. As shown, the additional speaker array 680 may include a first array of three speakers 118 mounted at a first common radial distance from the center 690 of the additional speaker array 680.

In the example of FIG. 6, the additional speaker array 680 beams the first sound 606 corresponding to the first audio channel (e.g., the rear height channel) toward the seat 670 and/or toward a ceiling or roof (e.g., toward the top housing structure 138 of FIG. 1) of the enclosure 108, and beams the second sound 615 corresponding to the second audio channel (e.g., the ambience channel) toward a portion 688 of the enclosure 108 away from the seat 670. For example, the portion 688 of the enclosure 108 away from the seat 600 may include a front wall or a front window of the enclosure. Because the seats 600 and 670 face each other (e.g., and both face toward the center of the apparatus), an occupant seated in the seat 670 may perceive the front wall or front window of the apparatus as being a rear location for that occupant. The control circuitry of the apparatus 100 may operate the additional speaker array 680 to beam the second sound directly away from the seat 670 toward a front wall of the enclosure 108.

As illustrated in the example of FIG. 6, the control circuitry may also beam the third sound 611 corresponding to the third audio channel (e.g., the left surround channel) toward a third corner 684 of the enclosure 108, and to beam the fourth sound 613 corresponding to the fourth audio channel (e.g., the right surround channel) toward a fourth corner 682 of the enclosure 108. In this way, the additional speaker array 680 may act as a directional beamforming speaker array that generates sounds that occupants within the enclosure 108 perceive as originating from various locations away from the additional speaker array 680.

In the example of FIG. 6, seat 670 faces the seat 600, and may also be facing a rear of the apparatus 100. However, this is merely illustrative and, in other implementations, the seat 670 may face in the same direction as the seat 600 (e.g., toward the front of a vehicle). In one or more implementations, the seat 670 may be rotatable from an orientation that faces in the same direction as the seat 600 faces (e.g., toward the front of a vehicle, such as in a human operator mode or a semiautonomous mode) to an orientation that faces toward the seat 600 (e.g., in the opposite direction of direction in which the seat 600 faces, such as in an autonomous driving mode) or to another orientation such as facing out the left or right side of the vehicle (e.g., in the autonomous driving mode). In any of these implementations, each of the seats or each group of seats that faces the same direction within the apparatus may have a corresponding speaker array (e.g., speaker array 610 and/or speaker array 680) mounted behind the seat back, or a speaker array (e.g., speaker array 610) may be mounted behind a row or behind several rows of seats that face in the same direction.

FIG. 7 illustrates additional details of the speaker array 610 in accordance with one or more implementations. The example of FIG. 7 is described in connection with the speaker array 610, for convenience. However, the structures of the speaker array 610 of FIG. 7 may also be implemented in the additional speaker array 680 of FIG. 6 (e.g., rotated one-hundred eighty degrees when arranged in the implementation of FIG. 6).

As shown in FIG. 7, the speaker array 610 may include a support structure 700 (e.g., a frame) to which the speakers 118 are mounted. As shown, the speaker array 610 may include a first array of speakers 118 mounted at a first common radial distance 701 from the center 650 of the speaker array 610, and a second array of speakers 118M mounted at a second common radial distance 708 from the center 650 of the speaker array 610. In this example, the second common radial distance 708 is larger than the first common radial distance 701. In this example, the first array of speakers 118 is a first triangular array of three speakers 118, and the second array of speakers 118M is a second triangular array of three speakers 118M, and the speakers 118M of the second triangular array have a common size (e.g., a common diameter or common area of the speaker diaphragm) that is larger than a common size (e.g., a common diameter or common area of the speaker diaphragm) of the speakers 118 of the first triangular array. For example, the speakers 118M may be mid-range speakers of the speaker array 610 and the speaker 118 of the speaker array 610 may be tweeters. In this example, the first triangular array is rotated, within the plane in which the speakers are mounted, relative to the second triangular array.

In one or more implementations, the apparatus 100 may include control circuitry for the speaker array 610. For example, the control circuitry for the speaker array 610 may include a control channel and a digital signal processor for each speaker 118 of the first array of speakers and each speaker 118M of the second array of speakers. As another example, each speaker 118 of the first array of speakers 118 may form (e.g., may be wired to form) a speaker pair with a respective speaker 118M of the second array of speakers (e.g., a speaker 118M disposed anti-clockwise across the array). In these implementations, the control circuitry for the speaker array 610 may include a control channel and a digital signal processor for each speaker pair, and a passive crossover circuit for each control channel. For example, the passive crossover circuit may include an inductor and a capacitor (e.g., arranged to form a first order crossover network) that passively cause audio signals below a lower frequency threshold to be provided to a speaker 118M of a speaker pair, audio signals above an upper frequency threshold to be provided to a speaker 118 of the speaker pair, and audio signals between the lower frequency threshold and the upper frequency threshold to be provided to both the speaker 118 and the speaker 118M of the speaker pair.

In one or more implementations, one or more of the speakers 118 of the first array of speakers 118 and/or one or more of the speakers 118M of the second array of speakers may be provided with a directional output component, such as an acoustic duct. For example, FIG. 8 illustrates an exemplary implementation in which the first triangular array of three speakers 118 includes a directional speaker having an acoustic duct 800 with one or more slots such as slot 802. In this example, the slot(s) 802 allow portions of the sound generated by a sound-generating element acoustically coupled to the acoustic duct 800 to leak out of the acoustic duct 800 to the external environment at various locations along the length of the acoustic duct 800. Because the sound that exits the slot(s) 802 leaks out of the acoustic duct 800 at various distances from the sound-generating element, the sound exits with varied phases that substantially cancel out the sound in a direction perpendicular to the longitudinal axis of the acoustic duct 800. In this way, the acoustic duct 800 directs the sound through a direction along a longitudinal axis of the acoustic duct 800 and to a desired location within the enclosure 108. Although the example of FIG. 8 illustrates one speaker of the speaker array 610 having an acoustic duct, in other implementations, two, three, or more than three of the speakers of the speaker array 610 may be provided with an acoustic ducts oriented in various directions, in various implementations.

Figure 9:
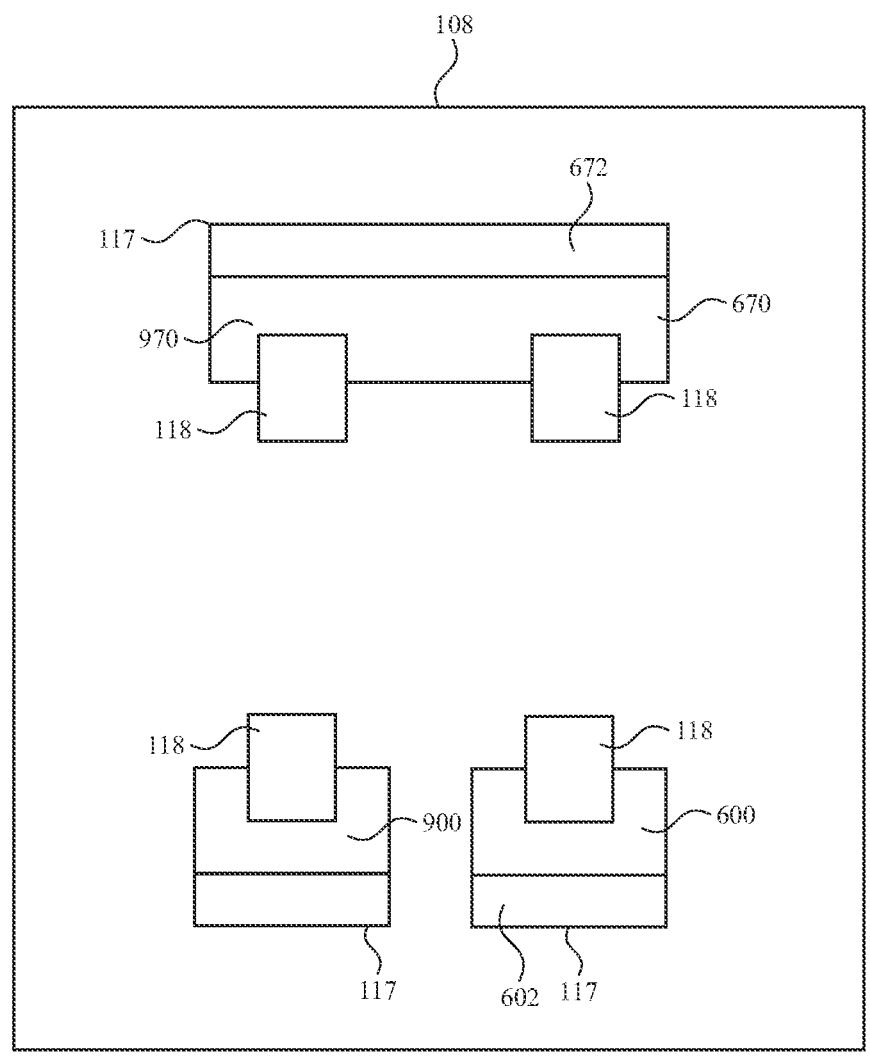
FIG. 9 illustrates a top view of an example apparatus having an enclosed space and incorporating an isobaric speaker in accordance with implementations of the subject technology.

FIG. 9 illustrates a top view of the apparatus 100 in which the speaker 118 is implemented as an isobaric cross-firing speaker. In the example of FIG. 9, the apparatus 100 includes the enclosure 108, a seat 600 (e.g., a first seat) within the enclosure 108 and facing in a first direction, a seat 670 (e.g., a second seat) within the enclosure 108 and facing in a second direction substantially opposite the first direction, and a speaker 118, implemented as a first isobaric speaker, and mounted nearer the seat 600 than the seat 670.

As illustrated by the example of FIG. 9, the apparatus 100 may also include a speaker 118 (e.g., a second isobaric speaker) mounted nearer the seat 670 than the seat 600, a seat 900 (e.g., a third seat) laterally displaced from the seat 600 and facing in the first direction, a seat 970 (e.g., a fourth seat) laterally displaced from the seat 670 and facing in the second direction, a speaker 118 (e.g., a third isobaric speaker) mounted nearer the seat 900 than the seat 600, the seat 670, and the seat 970, and/or a speaker 118 (e.g., a fourth isobaric speaker) mounted nearer the seat 970 than the seat 600, the seat 970, and the seat 900. In this example, the speakers 118 may be mounted substantially above a corresponding one of the seats within the apparatus 100. In one or more implementations, the apparatus 100 may be implemented as a vehicle, the enclosure 108 may include a roll cage (e.g., including and/or formed by the structural support member 104 of FIG. 1) for the vehicle, and one or more or all of the isobaric speakers may be mounted to the roll cage.

In the example of FIG. 9, seats 670 and 970 respectively face the seats 600 and 900, and may also be facing a rear of the apparatus 100. However, this is merely illustrative and, in other implementations, the seats 670 and/or 970 may face in the same direction as the seats 600 and 900 (e.g., toward the front of a vehicle). In one or more implementations, the seats 670 and 970 may be rotatable from an orientation that faces in the same direction as the seats 600 and 900 face (e.g., toward the front of a vehicle, such as in a human operator mode or a semiautonomous mode) to an orientation that faces toward the seats 600 and 900 (e.g., in the opposite direction of the direction in which the seats 600 and 900 face, such as in an autonomous driving mode) or to another orientation such as facing out the left or right side of the vehicle (e.g., in the autonomous driving mode). In any of these implementations, each of the seats of the apparatus may have a corresponding isobaric speaker mounted above and/or in front of that seat (e.g., as described herein in the examples of FIGS. 10-12).

Figure 10:
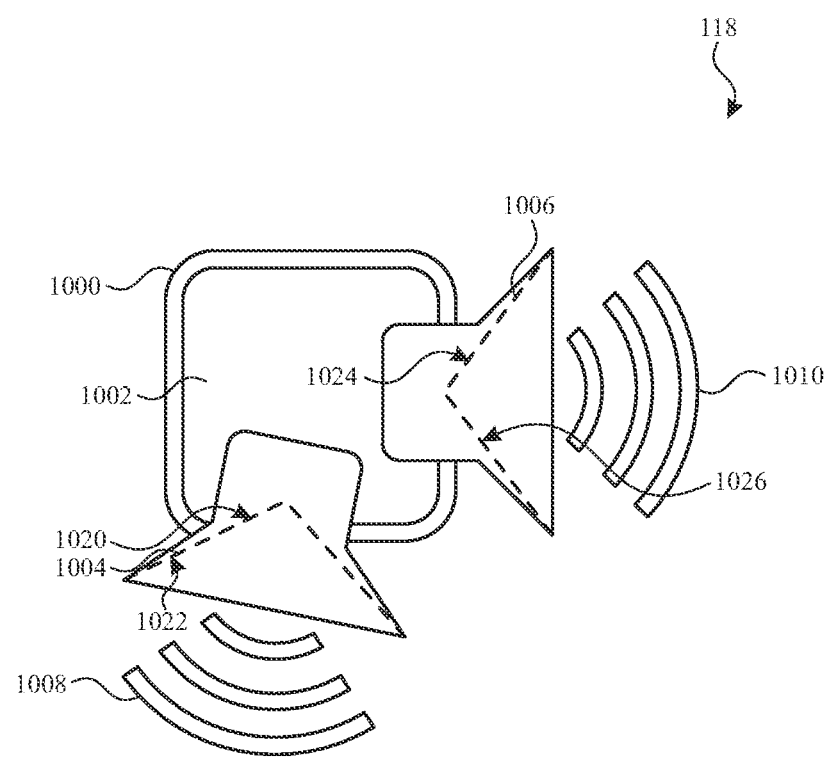
FIG. 10 illustrates an example isobaric speaker in accordance with implementations of the subject technology.

FIG. 10 illustrates additional details of an isobaric speaker as in the example of FIG. 9. As shown in FIG. 10, when implemented as an isobaric speaker, the speaker 118 may include a housing 1000 defining a back volume 1002, a first speaker diaphragm 1004 having a first surface 1020 adjacent the back volume 1002 and an opposing second surface 1022 facing outward, and a second speaker diaphragm 1006 having a first surface 1024 adjacent the back volume 1002 (e.g., the same back volume 1002, which may be referred to herein as a shared back volume) and an opposing second surface 1026 facing outward at an angle different from the angle at which the first speaker diaphragm 1004 faces. In this configuration, in operation, the first speaker diaphragm 1004 projects sound 1008 in a first direction and the second speaker diaphragm 1006 projects sound 1010 in a second direction different from the first direction.

In one or more implementations, one or more instances of the isobaric speaker of FIG. 10 may be mounted in the apparatus 100, such as in the configuration shown in FIG. 9. When mounted in the configuration of FIG. 9, the isobaric speaker of FIG. 10 may correspond to the first isobaric speaker, and the second surface 1022 of the first speaker diaphragm 1004 may face the seat 600, and the opposing second surface 1026 of the second speaker diaphragm 1006 may face away from the seat 600. As examples, the opposing second surface 1026 of the second speaker diaphragm 1006 may face the seat 670, a central location between the seat 600 and the seat 670, or substantially horizontally along a direction parallel to a direction extending between the seat 600 the seat 670.

Figure 11:
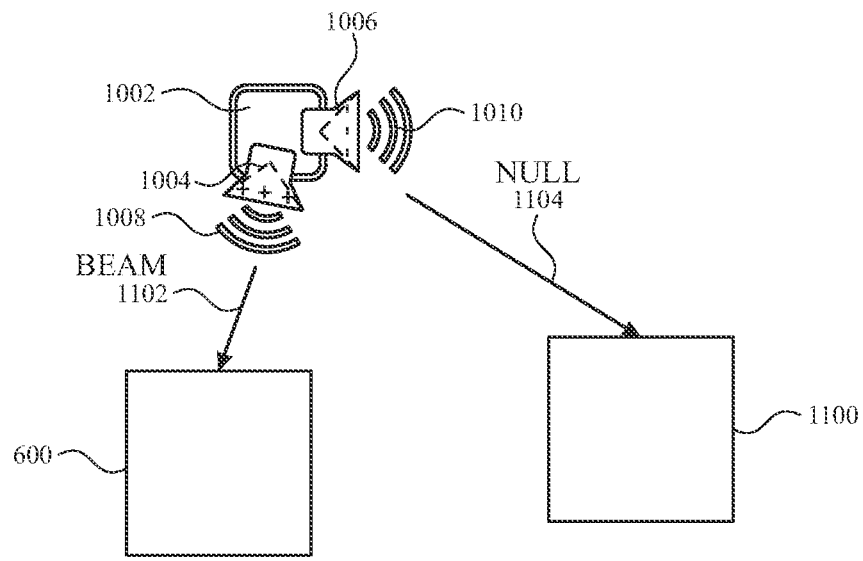
FIGS. 11 and 12 illustrates two respective operational modes of the example isobaric speaker of FIG. 10 in accordance with implementations of the subject technology.

As illustrated in FIG. 11, in a configuration in which the isobaric speaker of FIG. 10 is a first isobaric speaker mounted substantially above the seat 600, the isobaric speaker is operable in a first out-of-phase mode of operation in which the first speaker diaphragm 1004 emits a positive polarity sound 1008 and the second speaker diaphragm 1006 moves out of phase with the first speaker diaphragm 1004 to emits a negative polarity sound 1008 that cancels a portion of the positive polarity sound 1010 in a direction away from the seat 600. As shown, in this first out-of-phase mode of operation, the isobaric speaker directs an audible beam 1102 toward the seat 600 and a null beam 1104 toward another location 1100, such as toward the seat 670 and/or toward a location between the seat 600 and the seat 670.

Figure 12:
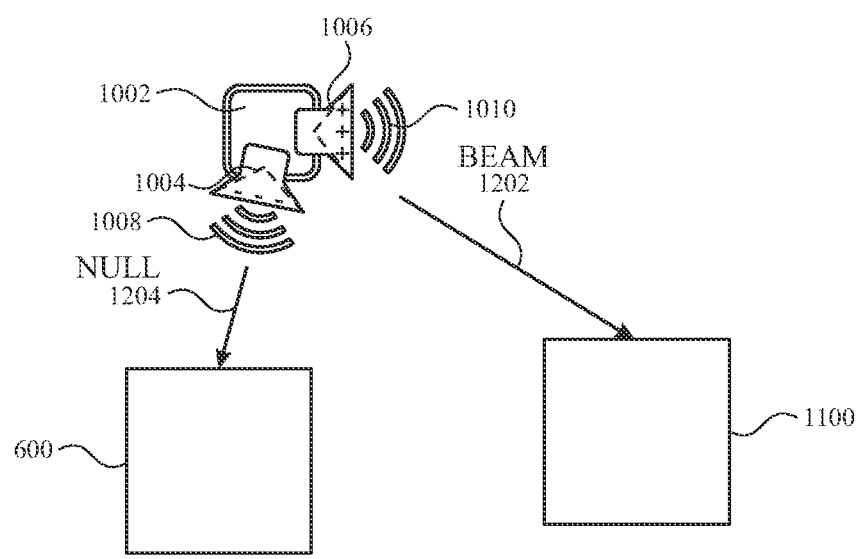
Figure 13:
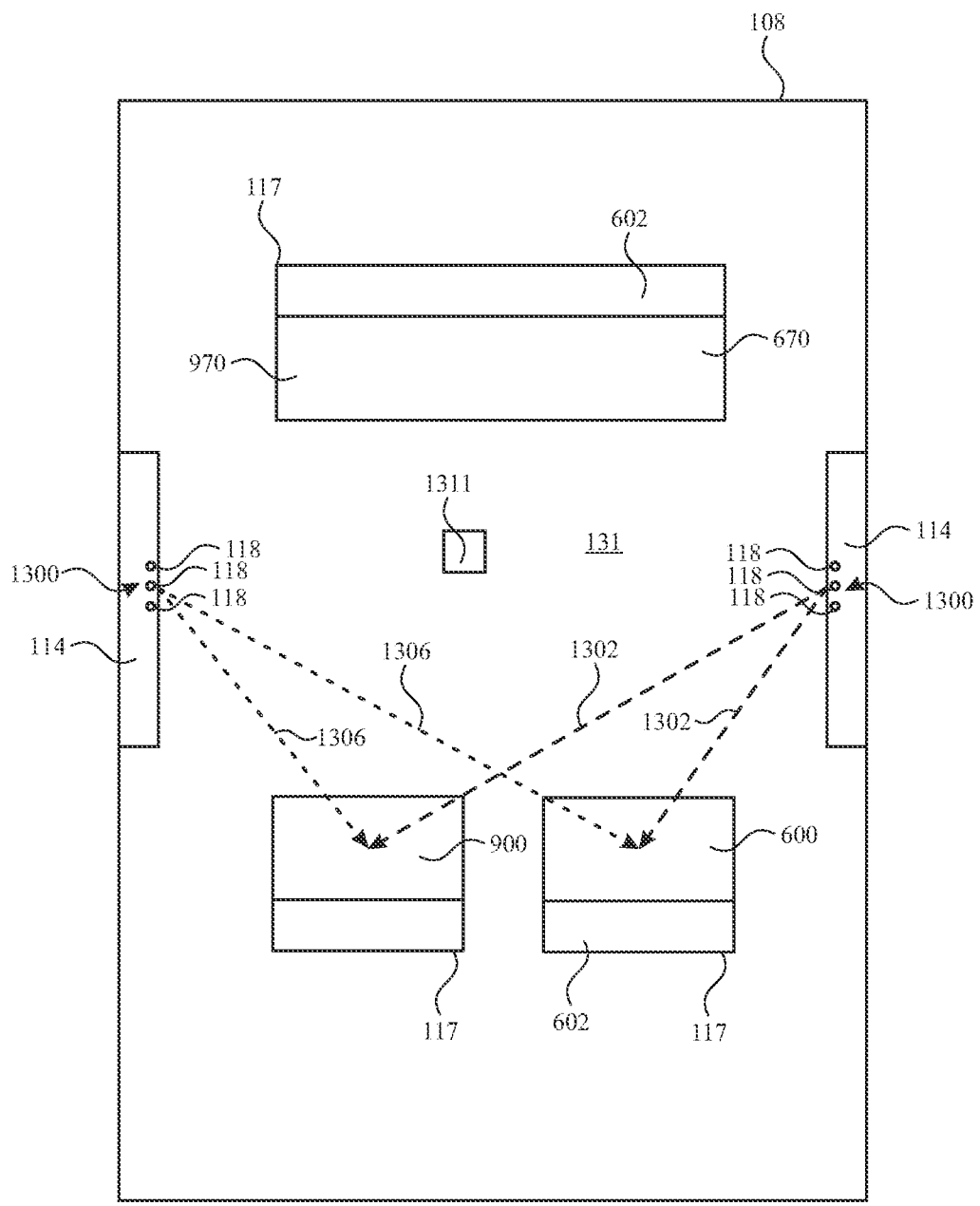
FIG. 13 illustrates a top view of an example apparatus having an enclosed space and incorporating a door-mounted speaker array in accordance with implementations of the subject technology.

As illustrated in FIG. 12, the first isobaric speaker is also operable in a second out-of-phase mode of operation in which the first speaker diaphragm 1004 emits a negative polarity sound 1008 and the second speaker diaphragm emits a positive polarity sound 1010 that cancels a portion of the negative polarity sound 1008 in a direction of the seat 600. As shown, in this second out-of-phase mode of operation, the isobaric speaker directs an audible beam 1202 toward the location 1100, and a null beam 1204 toward the seat 600. In this way, the isobaric speaker of FIGS. 10-12 can selectively beam audio content toward a particular seat or another particular location within the enclosure 108.

In various implementations, any or all of the speakers 118 of FIG. 9 can be implemented using the isobaric speaker implementation of FIG. 10, and/or operated in either of the out-of-phase modes of operation illustrated in FIGS. 11 and 12. It is appreciated that isobaric speakers mounted in the front and rear of the apparatus 100 may be mounted in orientations that are rotated by one hundred eighty degrees relative to each other, or at any other relative angle suitable to face a first speaker diaphragm toward a seat or other occupant location and a second speaker diaphragm that shares the same back volume away from that seat and/or toward another seat or toward a non-occupant location.

Because the first speaker diaphragm 1004 and the second speaker diaphragm 1006 of the isobaric speaker described herein operate out of phase with each other, pressure changes within the back volume 1002 are minimal during operation of the isobaric speaker, and thus the back volume 1002 may be a compact back volume. Providing the isobaric speaker with a compact back volume allows the speaker 118 to have a compact overall size, such as for mounting in compact spaces within the apparatus 100 (e.g., within or mounted to a structural support member and/or or a roll cage of a vehicle).

FIG. 13 illustrates an example in which the speaker 118 is implemented as a speaker of a door-mounted speaker array. As illustrated in the example of FIG. 13, in one or more implementations, the apparatus 100 may include the enclosure 108, an access feature 114 (e.g., a door) to the enclosure 108, and a beamforming speaker array 1300 mounted in the access feature. For example, the beamforming speaker array 1300 may include multiple speakers 118 that are co-operable to beam sound in one or more desired directions within the enclosed environment 131 within the enclosure 108.

In one or more implementations, the beamforming speaker array 1300 is a beamforming tweeter array (e.g., an array of multiple tweeters that are co-operable to beam sound in one or more desired directions within the enclosed environment 131 within the enclosure 108). In one or more implementations, the beamforming speaker array 1300 includes at least three speakers 118. In one or more implementations, at least two of the at least three speakers 118 of the beamforming speaker array 1300 share a common back volume. In one or more other implementations, each of the at least three speakers 118 of the beamforming speaker array 1300 have a dedicated individual back volume.

In one or more implementations, the apparatus 100 includes control circuitry (e.g., including the processor 190 and/or the memory 107 of FIG. 2) that operates the beamforming speaker array 1300. For example, the control circuitry may operate the beamforming speaker array 1300 (e.g., by selectively operating the individual speakers 118 of the speaker array to generate positive and negative interference regions within the enclosure 108) to beam a sound 1302 to arrive at a first location within the enclosure 108 at a first volume, and to beam the sound 1302 to arrive at a second location within the enclosure 108 at the first volume, the second location being further from the beamforming speaker array 1300 than the first location is from the beamforming speaker array 1300.

For example, as illustrated in FIG. 12, the first location may correspond a location of a first seat (e.g., seat 600) within the enclosure 108, and the second location corresponds to a location of a second seat (e.g., seat 900) within the enclosure 108. In one or more implementations, the apparatus 100 of FIG. 13 may be implemented as a vehicle. As shown in FIG. 13, the apparatus 100 may include an additional access feature 114 (e.g., an additional door) to the enclosure 108, the additional access feature 114 positioned opposite the access feature 114. As shown, the apparatus 100 may also include an additional beamforming speaker array (e.g., an additional implementation of the beamforming speaker array 1300) mounted in the additional access feature 114.

In one or more implementations, the control circuitry of the apparatus 100 may operate the additional beamforming speaker array on the opposite side of the apparatus (e.g., by selectively operating the individual speakers 118 of the additional beamforming speaker array to generate positive and negative interference regions within the enclosure 108) to beam a sound 1306 to arrive (e.g., in a first beam such as the right/upper beam of the sound 1306) at the first location within the enclosure 108 at a second volume, and to beam the sound 1306 to arrive (e.g., in a second beam such as the left/lower beam of the sound 1306) at the second location within the enclosure 108 at the second volume. With respect to the additional beamforming speaker array on the opposite side of the apparatus, the first location (e.g., the location of the seat 600) is further from the additional beamforming speaker array 1300 than the second location (e.g., the location of the seat 900) is from the additional beamforming speaker array 1300.

Because the seat 600 is nearer to the access feature 114 on the right side of the apparatus 100 than the seat 900 is to that access feature 114, a standard (e.g., non-beam-forming) speaker mounted in that access feature 114 will generate sound that is louder at the location of the seat 600 than at the location of the seat 900. Moreover, the sound from such a standard speaker will arrive at the location of the seat 600 before the same sound arrives at the location of the seat 900. Similarly, a standard speaker mounted in the additional access feature 114 (e.g., a second door) on the opposing side (e.g., left) of the enclosure 108 will generate sound that is louder at the location of the seat 900 than at the location of the seat 600 and that arrives at the location of the seat 900 before the same sound arrives at the location of the seat 600. These differences in volume and time-of-arrival of the sound from the speakers on the opposing sides of the enclosure 108 can cause a psycho-acoustic effect in which an occupant in the seat 600 perceives the speaker in the nearer access feature 114 to the seat 600 as the center origin of the sound, and an occupant in the seat 900 perceives the speaker in the nearer access feature 114 to the seat 900 as the center origin of the sound. This can be undesirable in various use cases, such as in a case in which the apparatus has a center speaker 1311 that is intended to be perceived as the center origin of the sound within the enclosure 108 (e.g., a center speaker 1311 that generates sound corresponding to center audio channel).

Providing the apparatus with the beamforming speaker arrays 1300 on the opposing sides of the enclosure 108 (e.g., mounted within or to the opposing access features 114) as illustrated in FIG. 13, and operating the beamforming speaker array 1300 on the right side of the apparatus to beam the sound 1302 to arrive (e.g., in respective third and fourth beams such as the right/lower beam and the left/upper beam of the sound 1302) at the first and second locations with the same first volume, and the additional beamforming speaker array 1300 on the left side of the apparatus to beam the sound 1306 to arrive at the first and second locations with the same second volume, can help reduce an occupant's perception of the center origin of the sound being located at one side of the enclosure.

In one or more implementations, the control circuitry may also operate the beamforming speaker array 1300 on the right side of the apparatus 100 to beam the sound 1302 to arrive (e.g., in a third beam such as the right/lower beam of the sound 1302) at the first location (e.g., the location of the seat 600) within the enclosure at a first time, and to beam the sound 1302 to arrive (e.g., in a fourth beam such as the left/upper beam of the sound 1302) at the second location (e.g., the location of the seat 900) within the enclosure at the first time (e.g., at the same time, such as by delaying, in time, emission of the beam that is directed at the first location relative to the emission of the beam that is directed at the second location). Similarly, the control circuitry may also operate the beamforming speaker array 1300 on the left side of the apparatus 100 (in the example of FIG. 13) to beam the sound 1306 to arrive at the second location (e.g., the location of the seat 900) within the enclosure 108 at a second time, and to beam the sound 1306 to arrive at the first location (e.g., the location of the seat 600) within the enclosure 108 at the second time (e.g., at the same time, such as by delaying, in time, the emission of the beam that is directed at the second location relative to the emission of the beam that is directed at the first location). Controlling the beams from the beamforming speaker arrays 1300 to arrive at multiple locations within the enclosure 108 at the same time, can further help reduce an occupant's perception of the center origin of the sound being located at one side of the enclosure.

In the examples described above in connection with FIG. 13, the beamforming speaker arrays 1300 are operable to beam sound to arrive at the same volume and/or at the same time at the locations of the seat 600 and the seat 900. It is also appreciated that the beamforming speaker arrays 1300 are also operable to beam sound to arrive at the same volume and/or at the same time at the locations of a seat 670 and/or a seat 970 within the enclosure 108 (e.g., in the configuration shown in FIG. 13 in which the seats 670 and 970 face the seats 600 and 900, or in another configuration in which the seats 670 and/or 970 face in the same direction as the seat 600 or the seat 900 or in another direction).

Although examples of separate implementations of the apparatus 100 are described herein in which the apparatus includes one or more dual directional speakers, one or more ringed arrays of speakers, and/or one or more isobaric cross-firing speakers, and/or one or more door-mounted speaker arrays for convenience of the discussion, it is appreciated that any combination of one or more dual directional speakers, one or more ringed arrays of speakers, one or more isobaric cross-firing speakers, and/or one or more door-mounted speaker arrays can be implemented in the same apparatus 100.

In one or more implementations, one or more speakers 118, in any of the implementations of any of the FIGS. 1-13, may be used to provide occupant-based audio output within the enclosed environment 131 defined by the enclosure 108. For example, the occupant-based audio output may be personalized audio output (e.g., including personalized notifications and/or any other audio content that is intended for a particular occupant) that is directed to the current location of the intended occupant (e.g., and suppressed or reduced at one or more other locations within the enclosure, using the speaker(s) 118.

Figure 14:
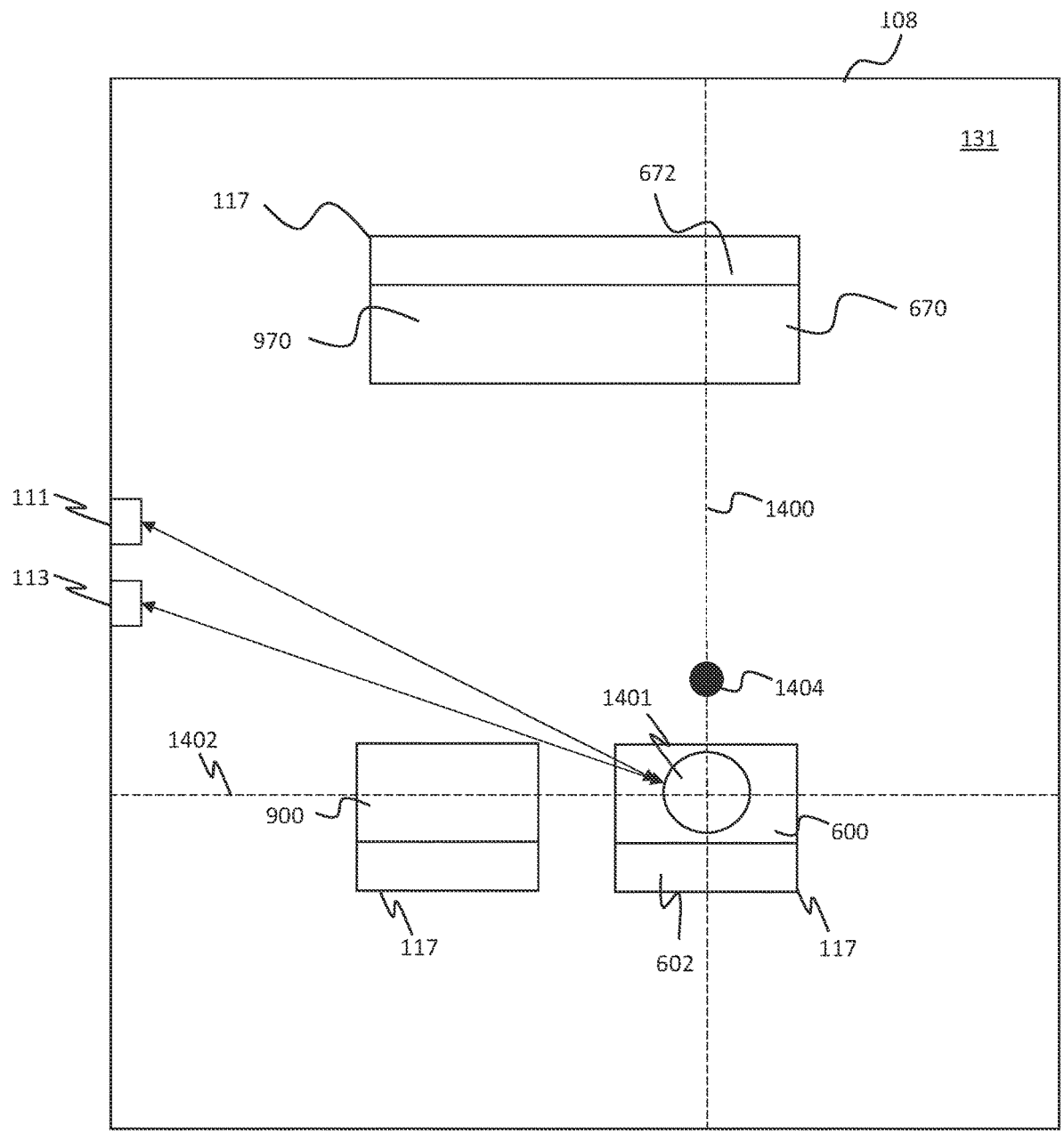
FIGS. 14-16 illustrates top views of an example apparatus providing occupant-based audio in accordance with implementations of the subject technology.

For example, FIG. 14 illustrates an example use case in which the apparatus 100 determines, using one or more cameras 111 and/or one or more sensors 113, that an occupant 1401 is present in the seat 600. In this example, the apparatus 100 (e.g., a computing component of the apparatus, such as the processor 190) modifies (e.g., responsive to the apparatus determining the occupant location) the output (e.g., the volume and/or other output characteristics) of two or more speakers 118, to move the left-right balance 1400 and the front-rear balance 1402 of the audio output to a location corresponding to the location of the occupant (e.g., the location of the seat 600 in this example). For example, the apparatus 100 may activate and/or increase the volume of audio output of one or more speakers 118 at the left and front of the apparatus and deactivate and/or decrease the volume of audio output of one or more speakers 118 at the right and rear of the apparatus to move the left-right balance 1400 and the front-rear balance 1402 to the location of the occupant.

In one or more implementations, the apparatus 100 may also (e.g., in addition to or alternatively to adjusting the left-right balance 1400 and the front-rear balance 1402) modify low frequency (LF) modal features of the output of one or more speakers 118 of the apparatus based on the location of the occupant 1401. For example, the apparatus 100 (e.g., a computing component of the apparatus, such as the processor 190) may modify the operation of one or more subwoofers and one or more other low frequency devices to optimize a low frequency modal response of the audio output at the location of the occupant 1401. In one or more implementations, the apparatus 100 may also (e.g., in addition to or alternatively to adjusting the left-right balance 1400 and the front-rear balance 1402 and/or the LF modal response) modify the frequency equalization (EQ) of the audio output of one or more speakers 118 of the apparatus 100 based on the location of the occupant 1401, as determined by the apparatus 100 (e.g., by the processor 190 using the camera(s) 111 and/or the sensor(s) 113).

FIG. 14 also illustrates that the apparatus 100 can (e.g., in addition to or alternatively to adjusting the left-right balance 1400 and the front-rear balance 1402, the LM modal response, and/or the EQ) modify the operation of one or more speakers 118 of the apparatus 100 to create a phantom center 1404 of the audio output of the speakers, at a location in front of the occupant 1401. For example, the apparatus 100 may utilize one or more dual-directional speakers, one or more ringed (e.g., beamforming) arrays of speakers, one or more isobaric cross-firing speakers, and/or one or more door-mounted speaker arrays (as described herein) to direct and/or beam audio output within the enclosure 108 to create a psycho-acoustic effect for the occupant 1401 that causes the occupant 1401 to perceive the sound generated within the enclosed environment 131 as originating at the phantom center 1404 (e.g., even if no physical speaker is located at the phantom center 1404).

In the example of FIG. 14, a single occupant 1401 is located at the seat 600, and the LF modal response, the EQ, the left-right balance 1400 and the front-rear balance 1402, and/or the phantom center 1404 generated by the speaker(s) 118 of the apparatus 100 are adjusted for the location of that single occupant. In other example use cases, a single occupant 1401 may be determined (e.g., by the processor 190 using one or more cameras 111 and/or one or more sensors 113) to be located at the seat 670, the seat 900, or the seat 970 (e.g., or another location within the enclosed environment 131), and the LF modal response, the EQ, the left-right balance 1400 and the front-rear balance 1402, and/or the phantom center 1404 may be adjusted for the location of the seat 670, the seat 900, or the seat 970, using similar speaker operations to those described above for the example of the seat 600. In one or more use cases, the apparatus 100 (e.g., the processor 190 using one or more cameras 111 and/or one or more sensors 113) may also identify the occupant 1401 and provide personalized audio content for the identified occupant at the location of the seat 600 (e.g., or the seat 670, the seat 900, or the seat 970 if the occupant is identified at the location of the seat 670, the seat 900, or the seat 970).

The identity of the occupant may be determined based on a credential (e.g., a ticket or other boarding pass) presented by the occupant to a scanner and/or camera of the apparatus 100, and/or via biometric identification of the occupant using the camera(s) and/or the sensor(s) 113, with the explicit permission of the occupant.

In one or more other example use cases, more than one occupant may be located within the enclosed environment 131. As examples, FIG. 15 illustrates an example use case in which two occupants are determined to be located within the enclosed environment 131, and FIG. 16 illustrates an example in which four occupants are determined to be located within the enclosed environment 131.

Figure 15:
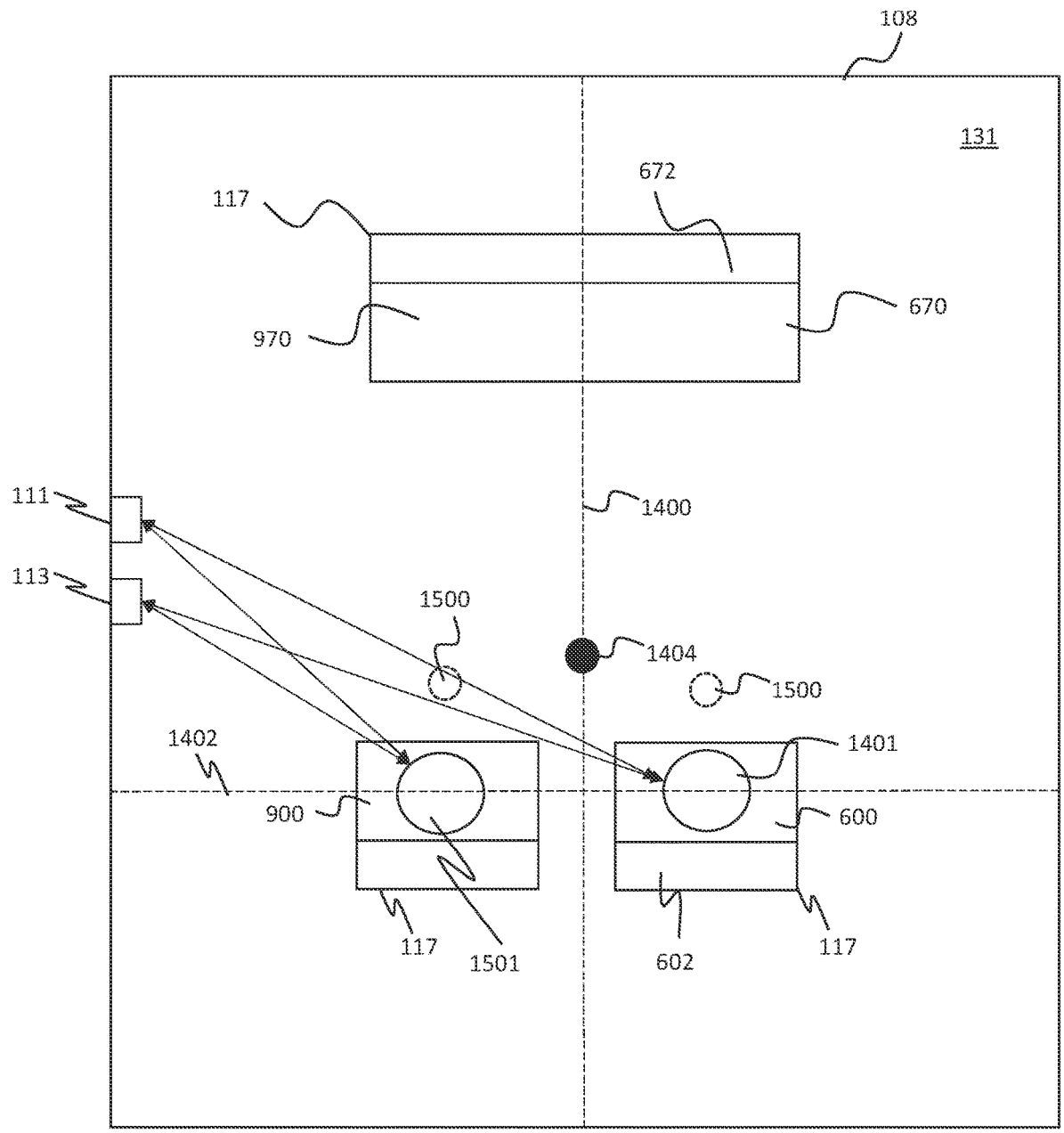

In the example of FIG. 15, the apparatus 100 (e.g., the processor 190, using one or more cameras 111 and/or one or more sensors 113) determines that an occupant 1401 is present in the seat 600 and an occupant 1501 is present in the seat 900. In this example, the apparatus 100 (e.g., a computing component of the apparatus, such as the processor 190) modifies the output of one or more speakers 118 to move the left-right balance 1400 and the front-rear balance 1402 and/or the phantom center 1404 to a location that is based on an average or other combination of the locations of the occupant 1401 and the occupant 1501. In the example of FIG. 16, the apparatus 100 (e.g., the processor 190, using one or more cameras 111 and/or one or more sensors 113) determines that an occupant 1401 is present in the seat 600, an occupant 1501 is present in the seat 900, an occupant 1601 is present in the seat 670, and an occupant 1603 is present in the seat 970. In this example, the apparatus 100 (e.g., a computing component of the apparatus, such as the processor 190) modifies the output of one or more speakers 118 to move the left-right balance 1400 and the front-rear balance 1402 and/or the phantom center 1404 to a location that is based on an average or other combination of the locations of the occupant 1401, the occupant 1501 the occupant 1601, and the occupant 1603. However, FIGS. 16 and 17 also illustrate how, in one or more implementations, rather than moving the phantom center 1404 to an average or combined location for multiple occupants, the speakers 118 may be operated to generate a phantom center 1500 for each of the occupants, in front of the location of that occupant (e.g., in the configuration shown in FIGS. 14-16 in which the seats 670 and 970 face the seats 600 and 900, or in another configuration in which the seats 670 and/or 970 face in the same direction as that of the seat 600 and/or the seat 900 or in another direction). In the examples of FIGS. 15 and 16, the LF modal response, the EQ, and/or the audio content may also be modified for each occupant and/or for two or more or all of the detected and/or identified occupants.

Figure 17:
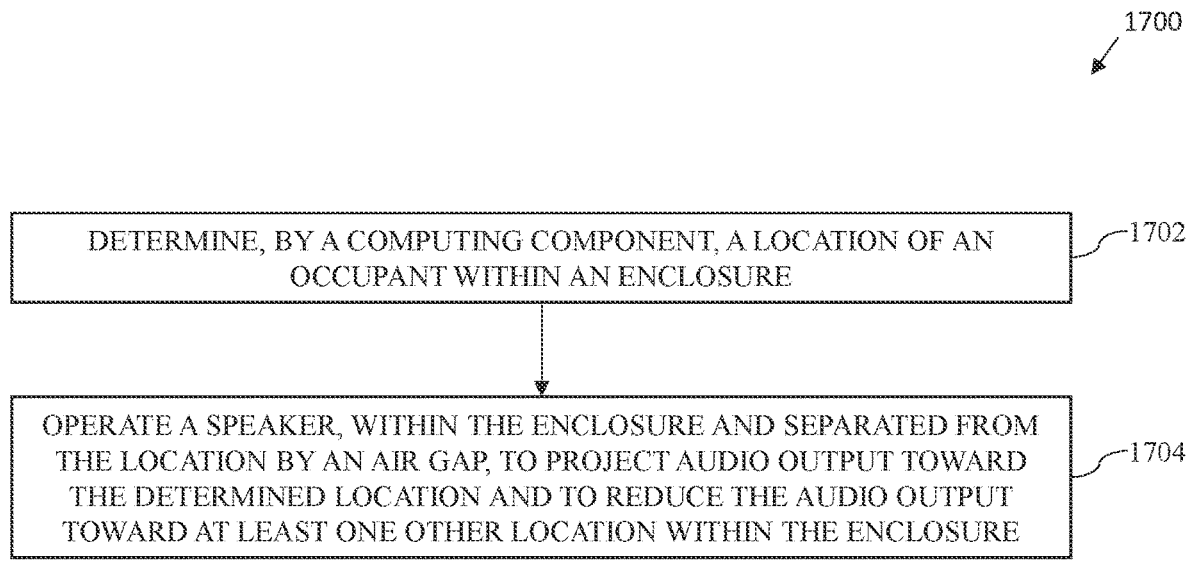
FIG. 17 illustrates a flow chart of example operations that may be performed for providing occupant-based audio in accordance with implementations of the subject technology.

FIG. 17 illustrates a flow diagram of an example process 1700 for providing occupant-based audio in an enclosed environment, in accordance with implementations of the subject technology. For explanatory purposes, the process 1700 is primarily described herein with reference to the apparatus 100 of FIGS. 1 and 2, implementing a speaker 118 as in the examples of FIGS. 3-13. However, the process 1700 is not limited to the apparatus 100 of FIGS. 1 and 2 or the implementations of the speaker 118 as in the examples of FIGS. 3-13, and one or more blocks (or operations) of the process 1700 may be performed by one or more other components of other suitable devices or systems. Further for explanatory purposes, some of the blocks of the process 1700 are described herein as occurring in serial, or linearly. However, multiple blocks of the process 1700 may occur in parallel. In addition, the blocks of the process 1700 need not be performed in the order shown and/or one or more blocks of the process 1700 need not be performed and/or can be replaced by other operations.

Figure 16:
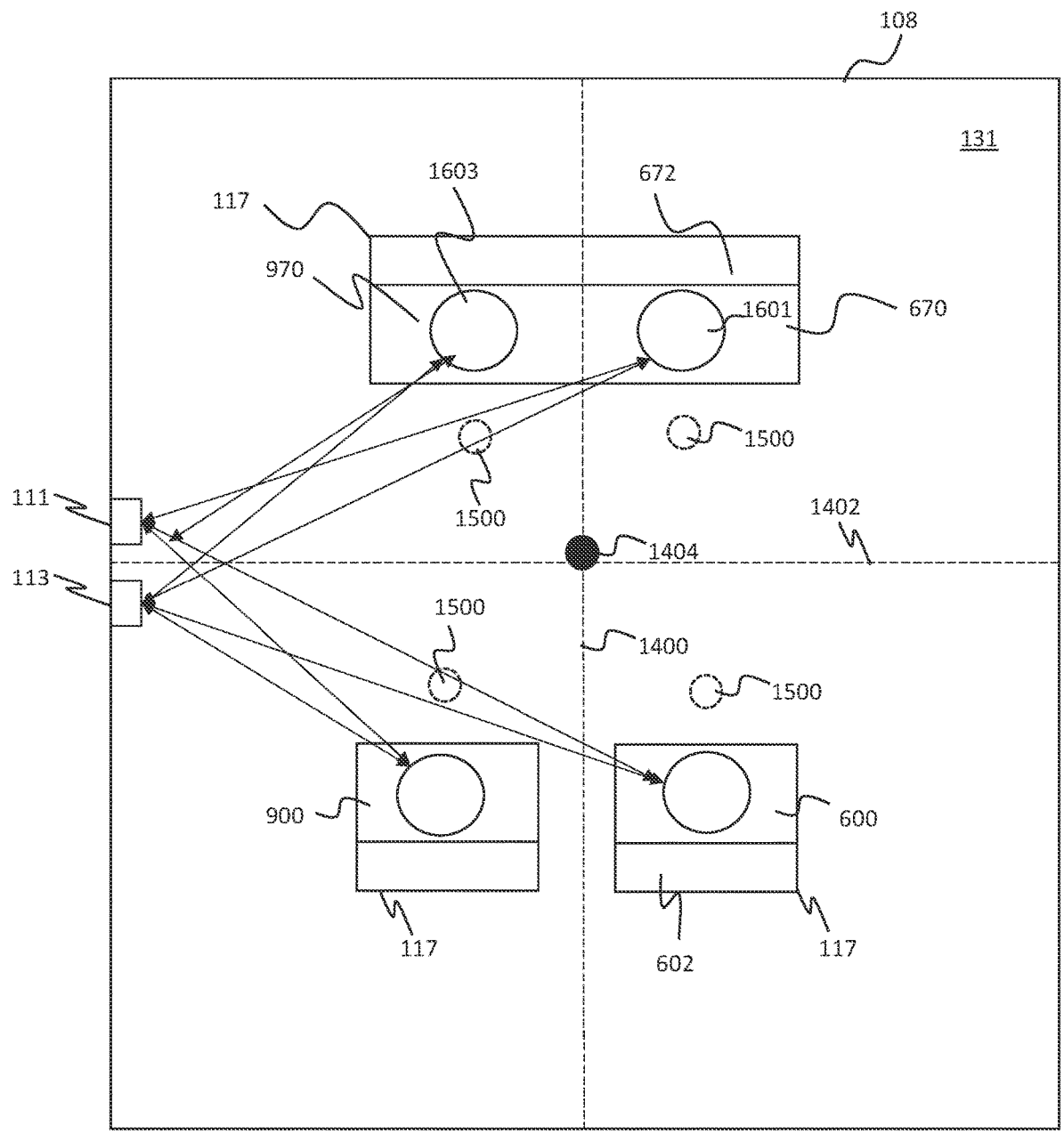

As illustrated in FIG. 17, at block 1702, a computing component (e.g., processor 190) of a movable platform (e.g., a movable platform implementation of the apparatus 100) having an enclosure (e.g., enclosure 108) may determine a location of an occupant (e.g., an occupant such as the occupant 1401, the occupant 1501, the occupant 1601, or the occupant 1603 of FIGS. 14-16) within the enclosure. In one or more implementations, the movable platform is a vehicle. In one or more implementations, the vehicle is an autonomous vehicle. In one or more implementations, determining the location of the occupant may include determining the location (e.g., with a processor such as processor 190) using a camera (e.g., a camera 111) or a sensor (e.g., a sensor 113) within the enclosure.

At block 1704, a speaker (e.g., speaker 118 in any of the implementations described herein in connection with FIGS. 3-13) may be operated within the enclosure to project audio output toward the determined location and to reduce the audio output toward at least one other location within the enclosure.

In one or more implementations, the process 1700 may also include identifying the audio output as personalized audio output for the occupant. In one or more implementations, the process 1700 may also include identifying, by the computing component, audio content for inclusion in the audio output projected toward the determined location based on an identity of the occupant. For example, identifying the audio content may include identifying a personalized notification for the occupant. For example, the personalized notification may be based on a current location of the movable platform. In one or more implementations, the process 1700 may also include identifying, by the computing component, audio content for inclusion in the audio output projected toward the determined location based on a content selection by the occupant (e.g., a selection of a song, or a selection of video content using a video screen, for playback associated with the occupant).

In one or more implementations, the process 1700 may also include operating the speaker and at least one additional speaker to modify at least one of a frequency equalization, a low frequency modal response, a left-right balance or a front-rear balance, based on the determined location of the occupant (e.g., as described herein in connection with FIG. 14). In some use cases, the process 1700 may also include determining, by the computing component of the movable platform, an additional location of an additional occupant within the enclosure, and modifying the operation of the speaker and the at least one additional speaker to further modify at least one of the frequency equalization, the low frequency modal response, the left-right balance or the front-rear balance, based on the determined location of the occupant and the determined additional location of the additional occupant (e.g., as described herein in connection with FIGS. 15 and 16).

In one or more implementations, operating the speaker to project the audio output toward the determined location and to reduce the audio output toward the at least one other location within the enclosure may include operating the speaker and at least one additional speaker to generate a phantom center at or near the determined location of the occupant (e.g., as described herein in connection with FIG. 14). In one or more implementations, the process 1700 may also include determining, by the computing component of the movable platform, an additional location of an additional occupant within the enclosure; and modifying the operation of the speaker and the at least one additional speaker to move the phantom center based on the determined location of the occupant and the determined additional location of the additional occupant (e.g., as described herein in connection with the phantom center 1404 of FIGS. 15 and 16). In one or more implementations, the process 1700 may also include determining, by the computing component of the movable platform, an additional location of an additional occupant within the enclosure, and modifying the operation of the speaker and the at least one additional speaker to maintain the phantom center based on the determined location of the occupant and to generate an additional phantom center at or near the determined additional location of the additional occupant (e.g., as described herein in connection with the phantom centers 1500 of FIGS. 15 and 16).

Figure 18:
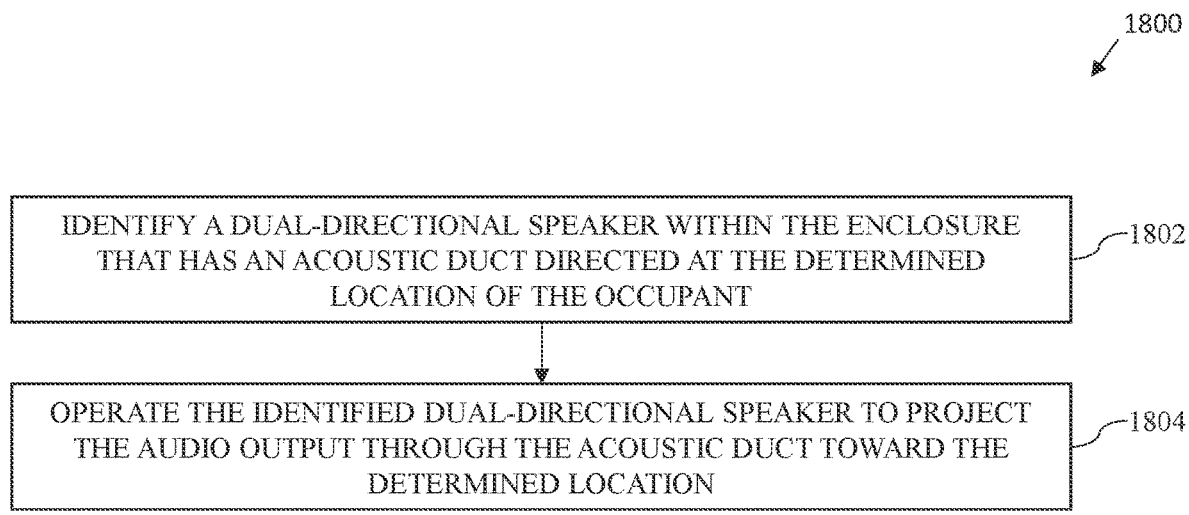
FIG. 18 illustrates a flow chart of example operations that may be performed for providing occupant-based audio using a dual-directional speaker in accordance with implementations of the subject technology.

FIG. 18 illustrates an example process for operating a speaker within an enclosure (e.g., to project audio output toward the determined location and to reduce the audio output toward at least one other location within the enclosure, as in block 1702 of FIG. 17), in an implementation in which the speaker is implemented as a dual-directional speaker (e.g., as in the examples of FIGS. 3-5).

In the example of FIG. 18, operating the speaker to project the audio output toward the determined location may include (at block 1802) identifying a dual-directional speaker within the enclosure that has an acoustic duct (e.g., an acoustic duct 314) directed at the determined location of the occupant, and (at block 1804) operating the identified dual-directional speaker (e.g., by providing power and/or audio output signals to the identified dual-directional speaker that cause a sound-generating element of the identified dual-directional speaker to generate sound in the acoustic duct) to project the audio output through the acoustic duct toward the determined location. For example, the acoustic duct may include a slot (e.g., a slot 312), and operating the speaker to reduce the audio output toward the at least one other location within the enclosure at block 1702 may include causing a portion of the audio output to exit the acoustic duct via the slot (e.g., at varying phases along the length of the slot).

In one or more implementations, the process 1800 may also include determining, by the computing component of the movable platform having the enclosure, an additional location of an additional occupant (e.g., an additional one of the occupant 1401, the occupant 1501, the occupant 1601 and the occupant 1603) within the enclosure, and operating an additional speaker (e.g., operating an additional speaker 118, at least in part, by providing power and/or audio output signals to the identified additional speaker 118) within the enclosure to project different audio output toward the determined additional location and to reduce the different audio output toward the at least one other location within the enclosure. For example, operating the additional speaker to project the different audio output toward the determined additional location may include identifying an additional dual-directional speaker within the enclosure that has an acoustic duct (e.g., an acoustic duct 314) directed at the determined additional location of the additional occupant, and operating the identified additional dual-directional speaker to project the different audio output through the acoustic duct toward the determined additional location.

The acoustic duct of the identified additional dual-directional speaker may also include a slot (e.g., a slot 312), and operating the additional speaker to reduce the different audio output at the least one other location within the enclosure may include causing (e.g., by a sound-generating element of the additional dual-directional speaker) a portion of the different audio output to exit the acoustic duct of the identified additional dual-directional speaker via the slot of the identified additional dual-directional speaker (e.g., at varying phases along the length of the slot of the identified additional dual-directional speaker). As discussed herein in connection with FIG. 5, in one or more implementations, the dual-directional speaker and the additional dual-directional speaker may be mounted on opposing sides of the moveable platform (e.g., mounted to opposing sides 134 and 135 of a structural support member such as structural support member 104).

FIG. 19 illustrates an example process for operating a speaker within an enclosure (e.g., to project audio output toward the determined location and to reduce the audio output toward at least one other location within the enclosure as in block 1702 of FIG. 17), in an implementation in which the speaker is implemented as a speaker of a beamforming array of speakers (e.g., as in the examples of FIGS. 6-8).

In the example of FIG. 19, operating the speaker to project the audio output toward the determined location may include, at block 1902, operating a beamforming array of speakers (e.g., speaker array 610 of FIG. 5) including the speaker to beam a first channel of the audio output toward the determined location. In one or more implementations, the process 1900 may also include operating the beamforming array of speakers to beam a second channel of the audio output away from the determined location (e.g., toward portion 618 of the enclosure). In one or more implementations, the process 1900 may also include operating the beamforming array of speakers to beam a third channel (e.g., a left surround channel) of the audio output toward a first corner (e.g., first corner 612) of the enclosure, and beam a fourth channel (e.g., a right surround channel) of the audio output toward a second corner (e.g., second corner 614) of the enclosure. In one or more implementations, the process 1900 may also include operating the beamforming array of speakers to beam a fifth channel (e.g., a rear height channel) of the audio output toward a top housing structure (e.g., top housing structure 138) of the enclosure. In one or more implementations, the first channel includes a center channel, the second channel includes an ambience channel, the third channel includes a left surround channel, the fourth channel includes a right surround channel, and the fifth channel includes a rear height channel.

In one or more implementations, operating the beamforming array of speakers at block 1902 may include operating a first array of speakers (e.g., speakers 118) mounted at a first common radial distance (e.g., a first common radial distance 701) from a center (e.g., center 650) of the beamforming array of speakers, and operating a second array of speakers (e.g., speakers 118M) mounted at a second common radial distance (e.g., a second common radial distance 708) from the center of the beamforming array of speakers, the second common radial distance larger than the first common radial distance (e.g., as described above in connection with FIG. 7). In one or more implementations, the beamforming array of speakers is disposed behind a seat (e.g., seat 600) within the enclosure (e.g., as described above in connection with FIG. 6). In one or more implementations, the beamforming array of speakers is a first beamforming array of speakers, and the process 1900 also includes operating a second beamforming array of speakers (e.g., an additional speaker array 680), which may be disposed behind a second seat (e.g., seat 670) within the enclosure.

Figure 20:
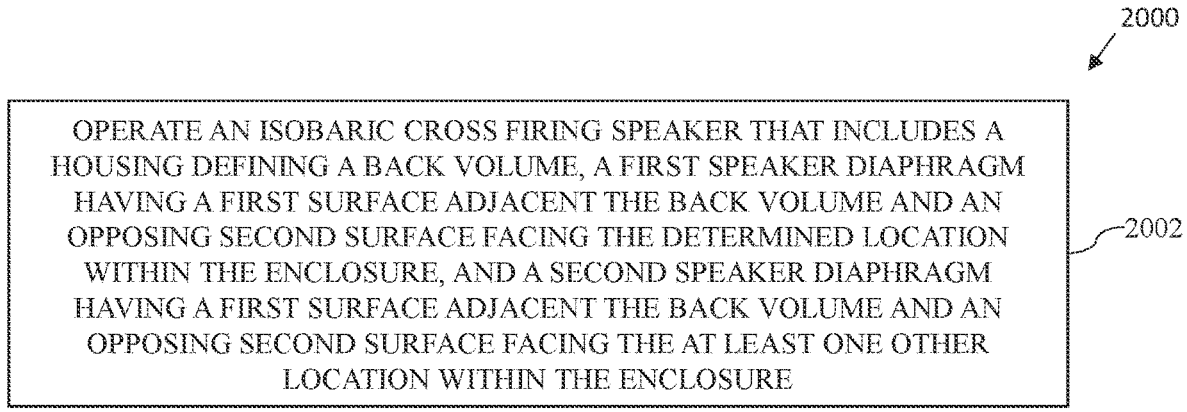
FIG. 20 illustrates a flow chart of example operations that may be performed for providing occupant-based audio using an isobaric cross firing speaker in accordance with implementations of the subject technology.

FIG. 20 illustrates an example process for operating a speaker within the enclosure (e.g., to project audio output toward the determined location and to reduce the audio output toward at least one other location within the enclosure as in block 1702 of FIG. 17), in an implementation in which the speaker is implemented as an isobaric cross firing speaker (e.g., as in the examples of FIGS. 9-12). In the example of FIG. 20, at block 2002, the process 2000 includes operating an isobaric cross firing speaker (e.g., a speaker 118 as in the example of FIG. 10) that includes a housing (e.g., a housing 1000) defining a back volume (e.g., a back volume 1002), a first speaker diaphragm (e.g., a first speaker diaphragm 1004) having a first surface (e.g., a first surface 1020) adjacent the back volume and an opposing second surface (e.g., an opposing second surface 1022) facing the determined location within the enclosure, and a second speaker diaphragm (e.g., a second speaker diaphragm 1006) having a first surface (e.g., a first surface 1024) adjacent the back volume and an opposing second surface (e.g., an opposing second surface 1026) facing the at least one other location (e.g., a location 1100) within the enclosure.

In one or more implementations, at block 2002, the movable platform may operate the isobaric cross firing speaker in a first out-of-phase mode of operation in which the first speaker diaphragm directs a positive polarity sound (e.g., sound 1008) toward the location within the enclosure and the second speaker diaphragm moves out of phase with the first speaker diaphragm to generate a negative polarity sound (e.g., sound 1010) that cancels a portion of the positive polarity sound in a direction of the at least one other location within the enclosure (e.g., as described herein in connection with FIG. 11).

In one or more implementations, the process 2000 may also include ceasing operating the isobaric cross firing speaker in the first out-of-phase mode of operation, and operating the isobaric cross firing speaker in a second out-of-phase mode of operation in which the second speaker diaphragm directs a positive polarity sound (e.g., sound 1010) toward the at least one other location within the enclosure and the first speaker diaphragm moves out of phase with the second speaker diaphragm to generate a negative polarity sound (e.g., sound 1008) that cancels a portion of the positive polarity sound in a direction of the location within the enclosure (e.g., as described herein in connection with FIG. 12). The pressure within the back volume may remain substantially constant during the first out-of-phase mode of operation and the second out-of-phase mode of operation, due to the out-of-phase motion of the two diaphragms.

In one or more implementations, the isobaric cross firing speaker is a first isobaric cross firing speaker, the audio output is a first audio output, the location within the enclosure corresponds to a location of a first seat (e.g., seat 600 of FIG. 9) within the enclosure, the at least one other location corresponds to a location of a second seat (e.g., seat 670 of FIG. 9) within the enclosure, and the process 2000 also includes operating a second isobaric speaker to project a second audio output toward the second seat and to reduce the second audio output toward the first seat. In one or more implementations, the process 2000 also includes operating a third isobaric speaker to project third audio output toward a third seat (e.g., seat 900 of FIG. 9) within the enclosure and to reduce the third audio output toward a fourth seat (e.g., seat 970 of FIG. 9) within the enclosure, and operating a fourth isobaric speaker to project fourth audio output toward the fourth seat within the enclosure and to reduce the fourth audio output toward the third seat.

In various implementations, the first audio output may be the same as, or different from, at least one of the second audio output, the third audio output, and the fourth audio output. In some use cases, the first audio output, the second audio output, the third audio output, and the fourth audio output may be different from each other of the first audio output, the second audio output, the third audio output, and the fourth audio output (e.g., in a use case in which the audio output from each isobaric cross firing speaker is personalized for each occupant within the enclosed environment 131).

Figure 21:
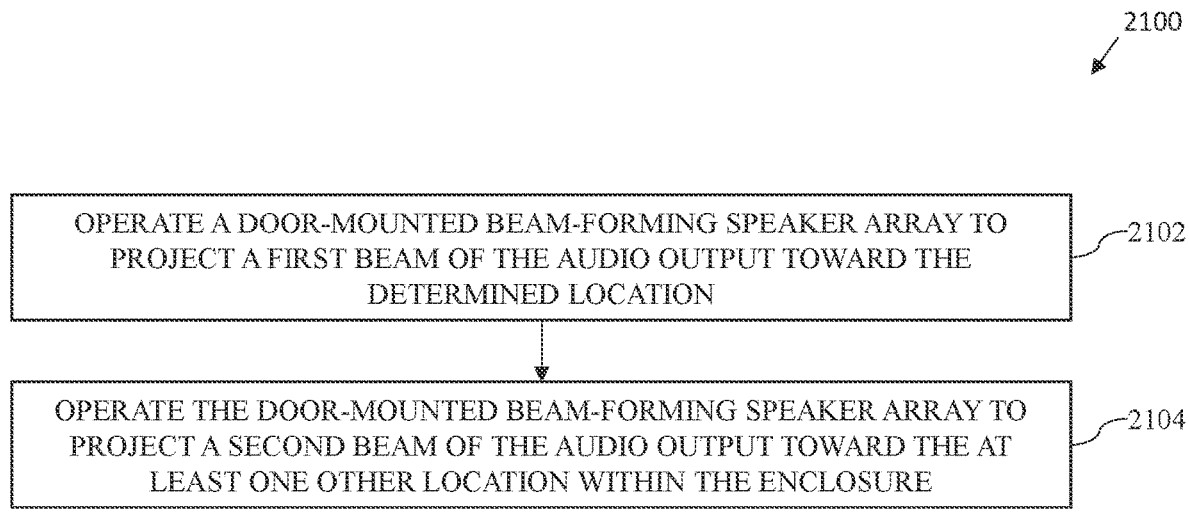
FIG. 21 illustrates a flow chart of example operations that may be performed for providing occupant-based audio using a door-mounted beamforming speaker array in accordance with implementations of the subject technology.

FIG. 21 illustrates an example process 2100 for operating a speaker within the enclosure (e.g., to project audio output toward the determined location and to reduce the audio output toward at least one other location within the enclosure as in block 1702 of FIG. 17), in an implementation in which the speaker is implemented as a speaker of a door-mounted beam-forming speaker array (e.g., as in the example of FIG. 13).

In the example of FIG. 21, operating the speaker to project the audio output toward the determined location may include (at block 2102) includes operating a door-mounted beam-forming speaker array (e.g., a beamforming speaker array 1300) of the movable platform to project a first beam (e.g., the right/upper beam of the sound 1306 of FIG. 13) of the audio output toward the determined location, and (at block 2104) operating the door-mounted beam-forming speaker array of the movable platform to project a second beam (e.g., the left/bottom beam of the sound 1306) of the audio output toward the at least one other location within the enclosure.

In one or more implementations, the determined location corresponds to location of a first seat (e.g., seat 600) within the enclosure, the at least one other location corresponds to a location of a second seat (e.g., seat 900) within the enclosure, the first seat disposed further from the door-mounted beam-forming speaker array (e.g., the beamforming speaker array 1300 at the left side of FIG. 13) than the second seat is to the door-mounted beam-forming speaker array. In one or more implementations, the process 2100 may also include delaying the second beam (e.g., the left/bottom beam of the sound 1306), in time, relative to the first beam (e.g., the right/upper beam of the sound 1306 of FIG. 13) so that the first beam arrives at the first seat (e.g., seat 600) at the same time that the second beam arrives at the second seat (e.g., the seat 900).

In one or more implementations, the door-mounted beam-forming speaker array is a first door-mounted beam-forming speaker array mounted in a first door (e.g., a first access feature 114) on a first side (e.g., the left side of FIG. 13) of the enclosure, and the process 2100 also includes operating a second door-mounted beam-forming speaker array (e.g., a second beamforming speaker array 1300) mounted in a second door (e.g., a second access feature 114) on an opposing second side (e.g., the right side of FIG. 13) of the enclosure to project a third beam (e.g., the right/lower beam of the sound 1302) of the audio output toward the first seat and a fourth beam (e.g., the left/upper beam of the sound 1302) of the audio output toward the second seat. For example, the third beam may be emitted with a volume that is less than a volume of the fourth beam. In one or more implementations, the third beam may also be delayed, in time, relative to the fourth beam so that the third beam arrives at the first seat at the same time that the fourth beam arrives at the second seat.

In one or more implementations, the process 2100 may also include operating the first door-mounted beam-forming speaker array of the movable platform to project a fifth beam of the audio output toward a third seat (e.g., the seat 670 of FIG. 13) within the enclosure and a sixth beam of the audio output toward a fourth seat (e.g., the seat 970 of FIG. 13) within the enclosure. The process 2100 may also include operating the second door-mounted beam-forming speaker array to project a seventh beam of the audio output toward the fourth seat and an eighth beam of the audio output toward the third seat.

Various processes defined herein consider the option of obtaining and utilizing a user's personal information. For example, such personal information may be utilized in order to provide occupant-based audio in an enclosed environment. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

In accordance with aspects of the subject disclosure, a method is provided that includes determining, by a computing component of a movable platform having an enclosure, a location of an occupant within the enclosure; and operating a speaker, within the enclosure and separated from the location by an air gap, to project audio output toward the determined location and to reduce the audio output toward at least one other location within the enclosure.

In accordance with aspects of the subject disclosure, a movable platform is provided that includes an enclosure; a speaker; and a computing component configured to: determine a location of an occupant within the enclosure; and operate the speaker to project audio output toward the determined location and to reduce the audio output toward at least one other location within the enclosure, the speaker separated from the determined location by an air gap.

In accordance with aspects of the subject disclosure, a non-transitory computer-readable medium is provided storing instructions which, when executed by one or more processors, cause the one or more processors to perform operations that include determining, by a computing component of a movable platform having an enclosure, a location of an occupant within the enclosure; and operating a speaker, within the enclosure and separated from the location by an air gap, to project audio output toward the determined location and to reduce the audio output toward at least one other location within the enclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neutral gender (e.g., her and its) and vice versa. Headings and subheadings, if any, are used for convenience only and do not limit the subject disclosure.

What is claimed is:

1. A method, comprising:
    determining, by a computing component, a location of an occupant in a room;
    operating at least a first speaker and a second speaker that are each within the room and separated from the location by an air gap, to generate a phantom center at or near the determined location of the occupant;
    determining, by the computing component, an additional location of an additional occupant within the room; and
    modifying the operation of at least the first speaker and the second speaker to move the phantom center based on the determined location of the occupant and the determined additional location of the additional occupant.

2. The method of claim 1, further comprising, identifying an audio output as personalized audio output for the occupant prior to operating at least the first speaker and the second speaker to generate the phantom center at or near the determined location of the occupant.

3. The method of claim 1, wherein operating at least the first speaker and the second speaker comprises:
    identifying a dual-directional speaker within the room that has an acoustic duct; and
    operating the identified dual-directional speaker to project an audio output including first audio content through the acoustic duct toward the phantom center.

4. The method of claim 3, wherein the acoustic duct comprises a slot, and wherein operating at least the first speaker and the second speaker comprises causing a portion of the audio output to exit the acoustic duct via the slot.

5. The method of claim 3, further comprising:
obtaining, by the computing component, second audio content; and
further modifying the operation of at least the first speaker and the second speaker to project a different audio output including the second audio content toward the determined additional location and to reduce the different audio output toward at least one other location within the room.

6. The method of claim 5, wherein further modifying the operation of at least the first speaker and the second speaker comprises:
identifying an additional dual-directional speaker within the room that has an acoustic duct; and
operating the identified additional dual-directional speaker to project the different audio output through the acoustic duct of the additional dual-directional speaker toward the determined additional location.

7. The method of claim 6, wherein the acoustic duct of the identified additional dual-directional speaker comprises a slot, and wherein operating the additional dual-directional speaker to reduce the different audio output at the least one other location within the room comprises causing a portion of the different audio output to exit the acoustic duct of the identified additional dual-directional speaker via the slot of the identified additional dual-directional speaker.

8. The method of claim 1, wherein operating at least the first speaker and the second speaker comprises operating a beamforming array of speakers including at least the first speaker and the second speaker to beam a first channel of an audio output toward the phantom center.

9. The method of claim 8, further comprising operating the beamforming array of speakers to beam a second channel of the audio output away from the phantom center.

10. The method of claim 9, further comprising operating the beamforming array of speakers to:
beam a third channel of the audio output toward a first corner of the room; and
beam a fourth channel of the audio output toward a second corner of the room.

11. The method of claim 10, further comprising operating the beamforming array of speakers to beam a fifth channel of the audio output toward a top of the room.

12. The method of claim 11, wherein the first channel comprises a center channel, the second channel comprises an ambience channel, the third channel comprises a left surround channel, the fourth channel comprises a right surround channel, and the fifth channel comprises a rear height channel.

13. The method of claim 8, wherein operating the beamforming array of speakers comprises:
operating a first array of speakers mounted at a first common radial distance from a center of the beamforming array of speakers; and
operating a second array of speakers mounted at a second common radial distance from the center of the beamforming array of speakers, the second common radial distance larger than the first common radial distance.

14. The method of claim 13, wherein the beamforming array of speakers is disposed behind a seat with in the room.

15. The method of claim 1, wherein operating at least the first speaker and the second speaker comprises operating an isobaric cross firing speaker that includes a housing defining a back volume, a first speaker diaphragm having a first surface adjacent the back volume and an opposing second surface facing the determined location within the room, and a second speaker diaphragm having a first surface adjacent the back volume and an opposing second surface facing at least one other location within the room.

16. The method of claim 15, wherein operating the isobaric cross firing speaker comprises operating the isobaric cross firing speaker in a first out-of-phase mode of operation in which the first speaker diaphragm directs a positive polarity sound toward the phantom center and the second speaker diaphragm moves out of phase with the first speaker diaphragm to generate a negative polarity sound that cancels a portion of the positive polarity sound in a direction of the at least one other location within the room.

17. The method of claim 16, further comprising:
ceasing operating the isobaric cross firing speaker in the first out-of-phase mode of operation; and
operating the isobaric cross firing speaker in a second out-of-phase mode of operation in which the second speaker diaphragm directs a positive polarity sound toward the at least one other location and the first speaker diaphragm moves out of phase with the second speaker diaphragm to generate a negative polarity sound that cancels a portion of the positive polarity sound in a direction of the location within the room.

18. The method of claim 17, wherein a pressure within the back volume remains substantially constant during the first out-of-phase mode of operation and the second out-of-phase mode of operation.

19. The method of claim 15, wherein the isobaric cross firing speaker is a first isobaric cross firing speaker, an audio output of the isobaric cross firing speaker comprises a first audio output, the location corresponds to a location of a first seat within the room, and the at least one other location corresponds to a location of a second seat within the room, the method further comprising:
operating a second isobaric speaker to project a second audio output toward the second seat and to reduce the second audio output toward the first seat.

20. The method of claim 19, further comprising:
operating a third isobaric speaker to project a third audio output toward a third seat within the room and to reduce the third audio output toward a fourth seat within the room; and
operating a fourth isobaric speaker to project a fourth audio output toward the fourth seat and to reduce the fourth audio output toward the third seat.

21. The method of claim 20, wherein the first audio output is different from at least one of the second audio output, the third audio output, and the fourth audio output.

22. The method of claim 1, wherein operating at least the first speaker and the second speaker comprises operating a beam-forming speaker array to project a first beam of an audio output toward the phantom center and a second beam of the audio output toward at least one other location within the room.

23. The method of claim 22, wherein the determined location corresponds to location of a first seat within the room, the at least one other location corresponds to a location of a second seat within the room, and the first seat is disposed further from the beam-forming speaker array than the second seat is to the beam-forming speaker array.

24. The method of claim 23, further comprising delaying the second beam, in time, relative to the first beam so that the first beam arrives at the first seat at a same time that the second beam arrives at the second seat.

25. The method of claim 24, wherein the beam-forming speaker array is a first beam-forming speaker array mounted on a first side of the room, the method further comprising operating a second beam-forming speaker array mounted on an opposing second side of the room to project a third beam of the audio output toward the first seat and a fourth beam of the audio output toward the second seat.

26. The method of claim 25, wherein the third beam has a volume that is less than a volume of the fourth beam.

27. The method of claim 26, further comprising delaying the third beam, in time, relative to the fourth beam so that the third beam arrives at the first seat at a same time that the fourth beam arrives at the second seat.

28. The method of claim 27, further comprising:
operating the first beam-forming speaker array to project a fifth beam of the audio output toward a third seat within the room and a sixth beam of the audio output toward a fourth seat within the room; and
operating the second beam-forming speaker array to project a seventh beam of the audio output toward the fourth seat and an eighth beam of the audio output toward the third seat.

29. The method of claim 1, wherein determining the location of the occupant comprises determining the location using a camera or a sensor within the room.

30. The method of claim 1, further comprising:
identifying, by the computing component, audio content for inclusion in an audio output projected toward the phantom center based on an identity of the occupant.

31. The method of claim 30, wherein identifying the audio content comprises identifying a personalized notification for the occupant.

32. The method of claim 1, further comprising:
identifying, by the computing component, audio content for inclusion in an audio output projected toward the phantom center based on a content selection by the occupant.

33. The method of claim 1, further comprising operating at least the first speaker and the second speaker to modify at least one of a frequency equalization, a low frequency modal response, a left-right balance or a front-rear balance based on the determined location of the occupant.

34. The method of claim 33, further comprising:
modifying the operation of at least the first speaker and the second speaker to further modify at least one of the frequency equalization, the low frequency modal response, the left-right balance or the front-rear balance based on the determined location of the occupant and the determined additional location of the additional occupant.

35. The method of claim 1, further comprising:
determining, by the computing component, a further additional location of a further additional occupant within the room; and
further modifying the operation of the at least the first speaker and the second speaker to maintain the moved phantom center based on the determined location of the occupant and the determined additional location of the additional occupant and to generate an additional phantom center at or near the determined further additional location of the further additional occupant.

36. A computing component configured to:
determine a location of an occupant within a room;
operate at least a first speaker and a second speaker that are each within the room and separated from the determined location by an air gap to generate a phantom center at or near the determined location of the occupant;
determine an additional location of an additional occupant within the room; and
modify the operation of at least the first speaker and the second speaker to move the phantom center based on the determined location of the occupant and the determined additional location of the additional occupant.

37. A non-transitory computer-readable medium storing instructions which, when executed by one or more processors, cause the one or more processors to perform operations comprising:
determining, by a computing component, a location of an occupant in a room;
operating at least a first speaker and a second speaker that are each within the room and separated from the location by an air gap, to generate a phantom center at or near the determined location of the occupant;
determining, by the computing component, an additional location of an additional occupant within the room; and
modifying the operation of at least the first speaker and the second speaker to move the phantom center based on the determined location of the occupant and the determined additional location of the additional occupant.

38. The method of claim 1, wherein no physical speaker is located at the phantom center or the moved phantom center.

39. The method of claim 1, wherein modifying the operation of at least the first speaker and the second speaker to move the phantom center based on the determined location of the occupant and the determined additional location of the additional occupant comprises modifying the operation of at least the first speaker and the second speaker to move the phantom center to a new location that is an average of the determined location of the occupant and the determined additional location of the additional occupant.

40. The method of claim 1, further comprising:
outputting, with at least the first speaker and the second speaker, a first audio output including first audio content to the moved phantom center;
obtaining, by the computing component, second audio content for the occupant and third audio content for the additional occupant;
further modifying the operation of at least the first speaker and the second speaker to:
output a second audio output including the second audio content to the phantom center at or near the determined location of the occupant; and
output a third audio output including the third audio content to another phantom center at or near the determined additional location of the additional occupant.

41. The method of claim 1, wherein operating at least the first speaker and the second speaker to generate the phantom center comprises operating at least the first speaker and the second speaker to generate an audio output to be perceived by the occupant as originating from the phantom center.

42. The method of claim 6, wherein operating at least the first speaker and the second speaker to generate the audio output comprises operating at least the first speaker and the second speaker to generate the audio output responsive to a selection of video content using a video screen within the room.

* * * * *